(12) United States Patent
Jackson et al.

(10) Patent No.: US 11,255,523 B2
(45) Date of Patent: Feb. 22, 2022

(54) FLASHLIGHT CLAMP

(71) Applicant: Home Depot Product Authority, LLC, Atlanta, GA (US)

(72) Inventors: Nicholas Jackson, Marietta, GA (US); Nicholas Servies, Kennesaw, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

(21) Appl. No.: 16/832,000

(22) Filed: Mar. 27, 2020

(65) Prior Publication Data
US 2021/0302011 A1 Sep. 30, 2021

(51) Int. Cl.
*F21V 21/088* (2006.01)
*F21V 21/096* (2006.01)
*F16B 2/12* (2006.01)
*F21V 21/30* (2006.01)

(52) U.S. Cl.
CPC ............ *F21V 21/0885* (2013.01); *F16B 2/12* (2013.01); *F21V 21/0965* (2013.01); *F21V 21/30* (2013.01)

(58) Field of Classification Search
CPC ..... F21V 21/0885; F21V 21/0965; F21B 2/12
USPC ......................................................... 362/396
See application file for complete search history.

(56) References Cited

U.S. PATENT DOCUMENTS

| | | | |
|---|---|---|---|
| 5,005,449 A | 4/1991 | Sorensen et al. |
| 5,094,131 A | 3/1992 | Sorensen et al. |
| D328,846 S | 8/1992 | Sorensen |
| 5,197,360 A | 3/1993 | Wooster, Jr. |
| D366,820 S | 2/1996 | Wooster, Jr. |
| 5,833,359 A | 11/1998 | Hollenbach |
| 6,315,278 B1 | 11/2001 | Gaztanaga |
| 6,438,854 B1 | 8/2002 | Kott, Jr. |
| 6,450,489 B1 | 9/2002 | Wang |
| D488,044 S | 4/2004 | Varzino |
| 6,749,166 B2 | 6/2004 | Valentine et al. |
| D494,828 S | 8/2004 | Phillips |
| D500,238 S | 12/2004 | Varzino |
| 6,957,808 B2 | 10/2005 | Varzino et al. |
| 7,040,609 B1 | 5/2006 | Liou |
| 7,066,457 B2 | 6/2006 | Gerritsen et al. |
| 7,572,024 B2 | 8/2009 | Ko |
| 7,810,967 B2 | 10/2010 | Ko |
| 7,850,329 B2 | 12/2010 | Henry et al. |
| 8,366,089 B2 | 2/2013 | Chen |

(Continued)

FOREIGN PATENT DOCUMENTS

| | | |
|---|---|---|
| CA | 2036328 | 8/1991 |
| CA | 2891086 | 5/2014 |

(Continued)

*Primary Examiner* — Christopher M Raabe
(74) *Attorney, Agent, or Firm* — Greenberg Traurig, LLP

(57) ABSTRACT

A light clamp apparatus includes a clamp configured to affix the light clamp apparatus to an object. The light clamp apparatus also includes a light assembly configured to removably attach to the clamp at least at two different positions on the clamp, the light assembly including a magnet, whereby the light assembly is removably attachable to a surface comprising a ferromagnetic metal. The clamp includes a slide bar comprising a first end and a second end, a first jaw coupled to the first end, and a body slidably receiving the slide bar having a second jaw opposing the first jaw. The clamp further includes a drive assembly for moving the slide bar in a first direction.

19 Claims, 23 Drawing Sheets

(56) References Cited

U.S. PATENT DOCUMENTS

| | | | |
|---|---|---|---|
| D685,510 S | 7/2013 | Henry et al. | |
| 8,485,073 B1 | 7/2013 | Lopez | |
| 8,840,264 B2 | 9/2014 | Molina et al. | |
| 9,115,878 B2 | 8/2015 | Ancona et al. | |
| 9,194,547 B2 | 11/2015 | Ancona et al. | |
| 9,328,751 B1 | 5/2016 | Liu | |
| 9,676,079 B2 | 6/2017 | Tropea | |
| 10,011,005 B2 | 7/2018 | Shute et al. | |
| 2014/0126192 A1 | 5/2014 | Ancona et al. | |
| 2014/0265085 A1 | 9/2014 | Albin | |
| 2016/0368119 A1 | 12/2016 | Clark | |
| 2021/0033248 A1* | 2/2021 | Cacciabeve | F21V 21/30 |
| 2021/0048182 A1* | 2/2021 | Sharrah | F21V 21/406 |
| 2021/0215327 A1* | 7/2021 | Grandadam | F21V 21/0965 |
| 2021/0222842 A1* | 7/2021 | Sharrah | F21V 21/145 |

FOREIGN PATENT DOCUMENTS

| | | |
|---|---|---|
| CA | 2891104 | 5/2015 |
| WO | 2014074918 | 5/2014 |
| WO | 2014074935 | 5/2014 |

\* cited by examiner

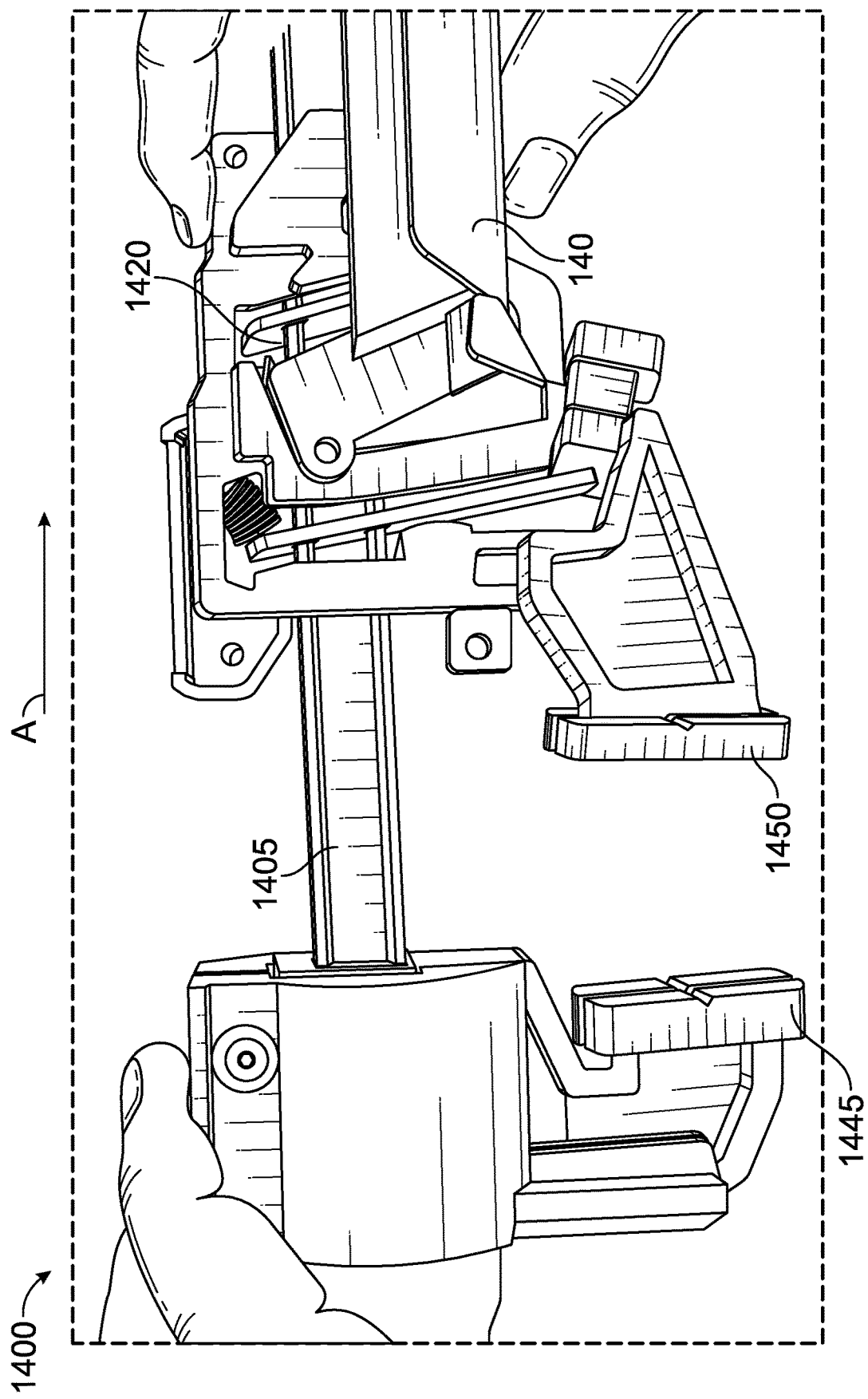

FLASHLIGHT CLAMP

BACKGROUND

Flashlights and other types of lights are often used to illuminate areas, such as work areas, hard to reach spaces, etc. For example, battery powered lights may be easily portable in order to illuminate a wide variety of locations.

SUMMARY

An illustrative light clamp apparatus includes a clamp configured to affix the light clamp apparatus to an object. The light clamp apparatus further includes a light assembly configured to removably attach to the clamp at least at two different positions on the clamp, the light assembly including a magnet, whereby the light assembly is removably attachable to a surface including a ferromagnetic metal.

An illustrative clamp apparatus includes a slide bar comprising a first end and a second end, a first jaw coupled to the first end, and a body slidably receiving the slide bar. The body includes a second jaw opposing the first jaw. The clamp apparatus further includes a drive assembly for moving the slide bar in a first direction. The drive assembly includes a driving lever having an aperture through which the slide bar extends, the driving lever movable between a first position in which there is substantially no frictional engagement between the driving lever and the slide bar and a second position in which the driving lever is frictionally engaged with the slide bar. The drive assembly further includes a trigger handle coupled to the body and configured to engage the driving lever for moving the driving lever between the first position and the second position. The drive assembly further includes a locking mechanism coupled to the body and configured to lock the trigger handle in a locked position, wherein the driving lever is frictionally engaged with the slide bar while the trigger handle is in the locked position.

An illustrative light clamp apparatus includes a clamp configured to affix the light clamp apparatus to an object. The clamp includes a slide bar comprising a first end and a second end, a first jaw coupled to the first end, and a body slidably receiving the slide bar. The body includes a second jaw opposing the first jaw. The clamp further includes a drive assembly for moving the slide bar in a first direction. The drive assembly includes a driving lever having an aperture through which the slide bar extends, the driving lever movable between a first position in which there is substantially no frictional engagement between the driving lever and the slide bar and a second position in which the driving lever is frictionally engaged with the slide bar. The drive assembly further includes a trigger handle coupled to the body and configured to engage the driving lever for moving the driving lever between the first position and the second position. The drive assembly further includes a locking mechanism coupled to the body and configured to lock the trigger handle in a locked position, wherein the driving lever is frictionally engaged with the slide bar while the trigger handle is in the locked position. The light clamp apparatus further includes a light assembly configured to removably attach to the clamp at least at two different positions on the clamp, the light assembly including a magnet, whereby the light assembly is removably attachable to a surface including a ferromagnetic metal.

BRIEF DESCRIPTION OF THE DRAWINGS

FIG. 14B is a side perspective view of the example flashlight clamp portion of FIG. 14A, with its drive assembly in a second state.

DETAILED DESCRIPTION

Figure 1A:
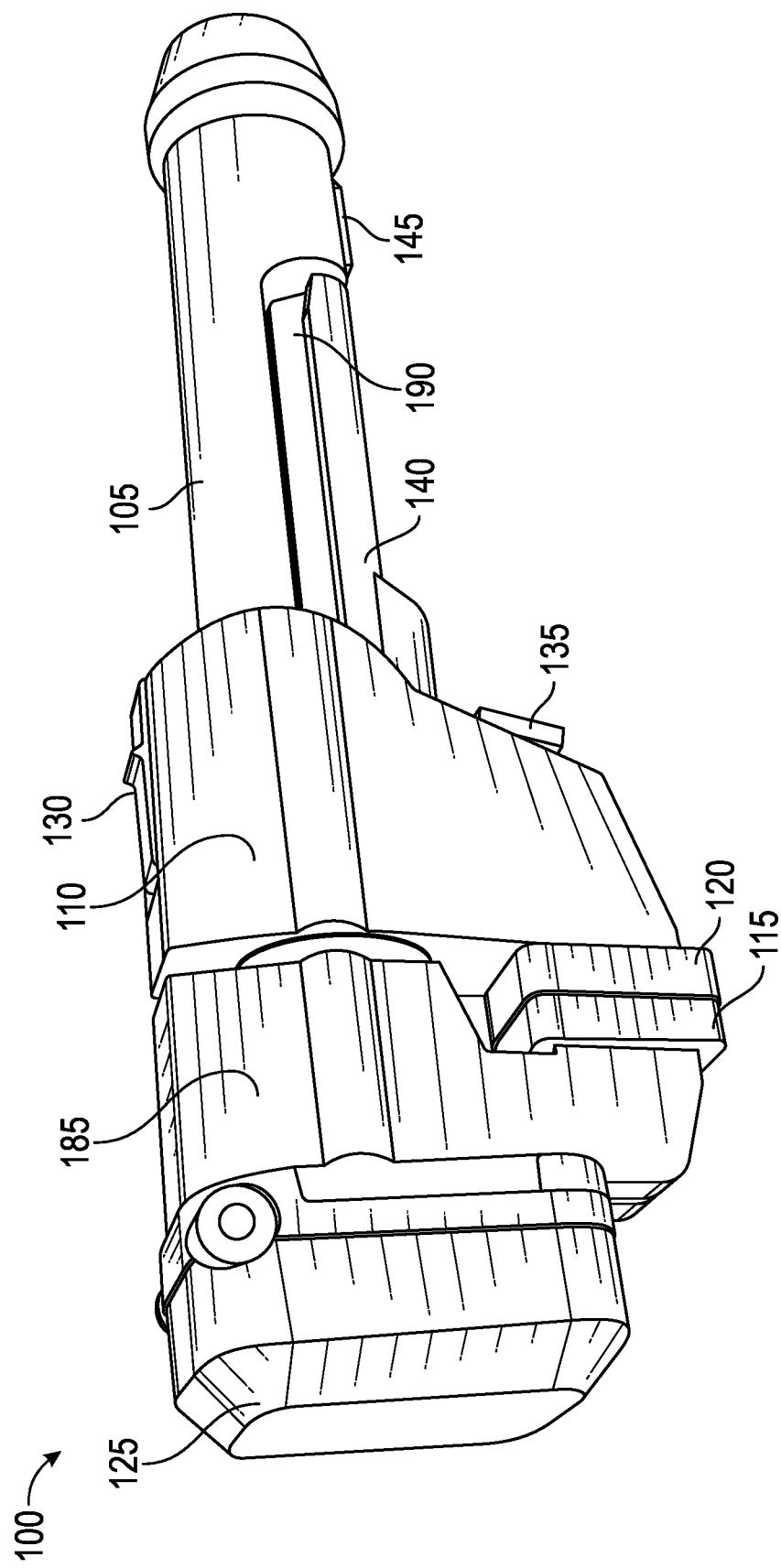
FIG. 1A is a perspective side view of an example flashlight clamp in a first state with the clamp closed, the handle locked, and the light assembly in a first position.

Described herein is an improved flashlight clamp that includes a light assembly that is removably attachable to different positions on the clamp. The clamp may be attached to different objects so that the light assembly can provide light in a variety of locations and settings and can be pointed in a variety of directions without requiring a user to hold the light assembly in place. The light assembly may be affixed to different locations on the clamp to emit light in different directions. Light assemblies as disclosed herein may also rotate in various directions while attached to a clamp to further customize where light is pointed. For example, a light assembly may include a hinge between a light source portion of the light assembly and a base portion of the light assembly that permits the light source portion to rotate about a first axis. The light assembly may also include a rotation mechanism between the base portion and an attachment portion of the light assembly, wherein the attachment portion is configured to attach to the clamp. The rotation mechanism permits movement of the light source portion about a second axis because the base portion rotates with respect to the attachment portion. The light assembly (e.g., the hinge and/or rotation mechanism) may also include detents so that after the light source portion is rotated or otherwise adjusted it may remain stationary relative to the clamp without being held in place by a user. The clamp may also be operated by a user with one hand, making operation of the flashlight clamps described herein easier to use. For example, the trigger handle of the clamps described herein may be actuated by a user with one hand to tighten the jaws of the clamp around an object.

The light assemblies described herein may easily be moved between and secured to two or more mounting locations/positions on a clamp. In this way, a user can change the configuration of a light assembly without the use of tools or other specialized equipment.

The light assemblies described herein may also include a magnet. The magnet may be of a particular type, strength, and orientation such that the light assembly is attachable to a surface made at least in part of a ferromagnetic metal. A magnetic force between the magnet and the ferromagnetic metal causes the light assembly to attach to the surface. The light assembly may also be rotated or otherwise adjusted in the same way it rotates/adjusts when it is attached to the clamps described herein. Accordingly, the lights described herein may be very versatile, being able to attach to multiple points of a clamp and to any ferromagnetic metal surface.

Various clamps described herein may also include a trigger handle that, when actuated by a user, causes the clamp to close. Advantageously, the clamp may also include a sliding tab for locking the trigger handle in place when the clamp is compressed. This maintains the trigger handle in a position that does not interfere or get in the way of a user, and in a position that is not accidentally bumped by a user. Maintaining the trigger handle in a locked position also causes a drive assembly of the clamp to provide additional frictional engagement to a slide bar of the clamp to prevent the clamp from opening as further described herein (e.g., as illustrated in and described with respect to FIGS. 13B, 14B).

Reference will now be made in detail to embodiments of the invention, examples of which are illustrated in the accompanying drawings. In the drawings, like reference numerals refer to the same or similar features. First, with respect to FIGS. 1A, 1B, and 2-9, example flashlight clamps with a light assembly that is positionable at multiple locations on the clamp will be described. With respect to FIG. 10, an example light assembly, which may find use with the flashlight clamps of FIGS. 1A, 1B, and 2-9, that is removably attachable to a ferromagnetic metal surface will be described. With respect to FIG. 11, an example clamp without a light assembly will be described. With respect to FIG. 12, the components of an example clamp will be described. With respect to FIGS. 13A, 13B, 14A, and 14B, example drive assembly components of example clamps will be described. With respect to FIGS. 14C and 14D, example braking assembly components of example clamps will be described. With respect to FIGS. 15A and 15B, an example light assembly will be described. Finally, with respect to FIGS. 16A-16C, an example flashlight clamp with a handle that is generally oriented perpendicular to a slide bar of the flashlight clamp will be described.

FIGS. 1A, 1B, 2-6, and 11 are perspective views of an example flashlight clamp 100. The example flashlight clamp 100 includes a handle 105, a body 110, a first jaw 115 connected to an arm 185, a second jaw 120 connected to the body 110, a light assembly 125, a brake release button 135, a trigger handle 140, a sliding tab 145, and a slide bar 155. The handle 105 is generally cylindrical in shape and is located at a first, proximal end of the flashlight clamp 100. The body 110 is connected to a distal end of the handle 105, and the second jaw 120 is connected to a lower end of the body 110 away from the handle 105. As used in this disclosure, "proximal" refers to an end or portion of a device, component, etc. that is towards the user or relatively closer to the user when the user holds the handle of the flashlight clamp, and "distal" refers to an end or portion of a device, component, etc. that is away from or relatively farther away from the user when the user holds the handle of the flashlight clamp.

Figure 1B:
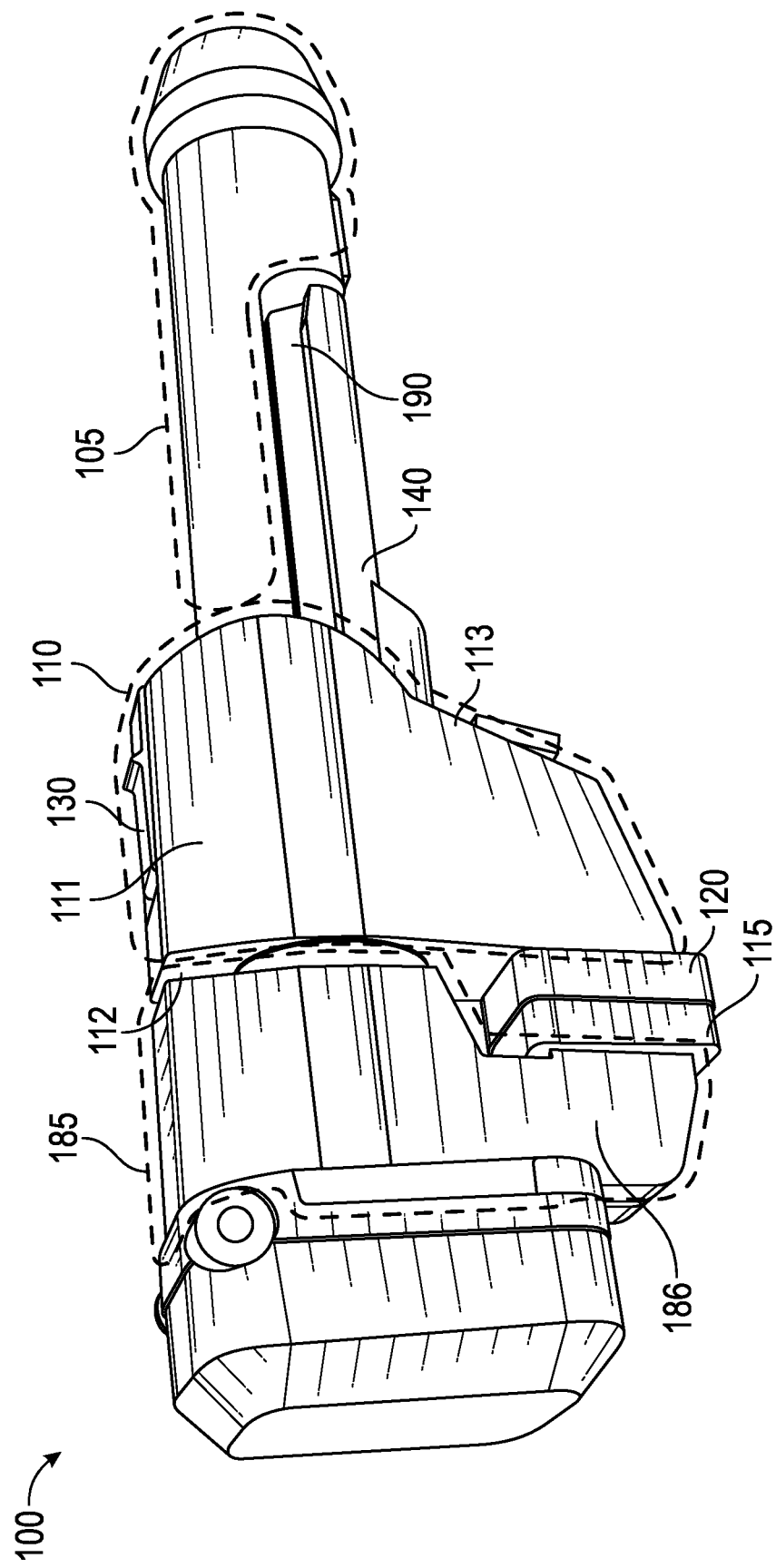
FIG. 1B is the perspective side view of the example flashlight clamp of FIG. 1A showing the locations of various components of the flashlight clamp.
Figure 2:
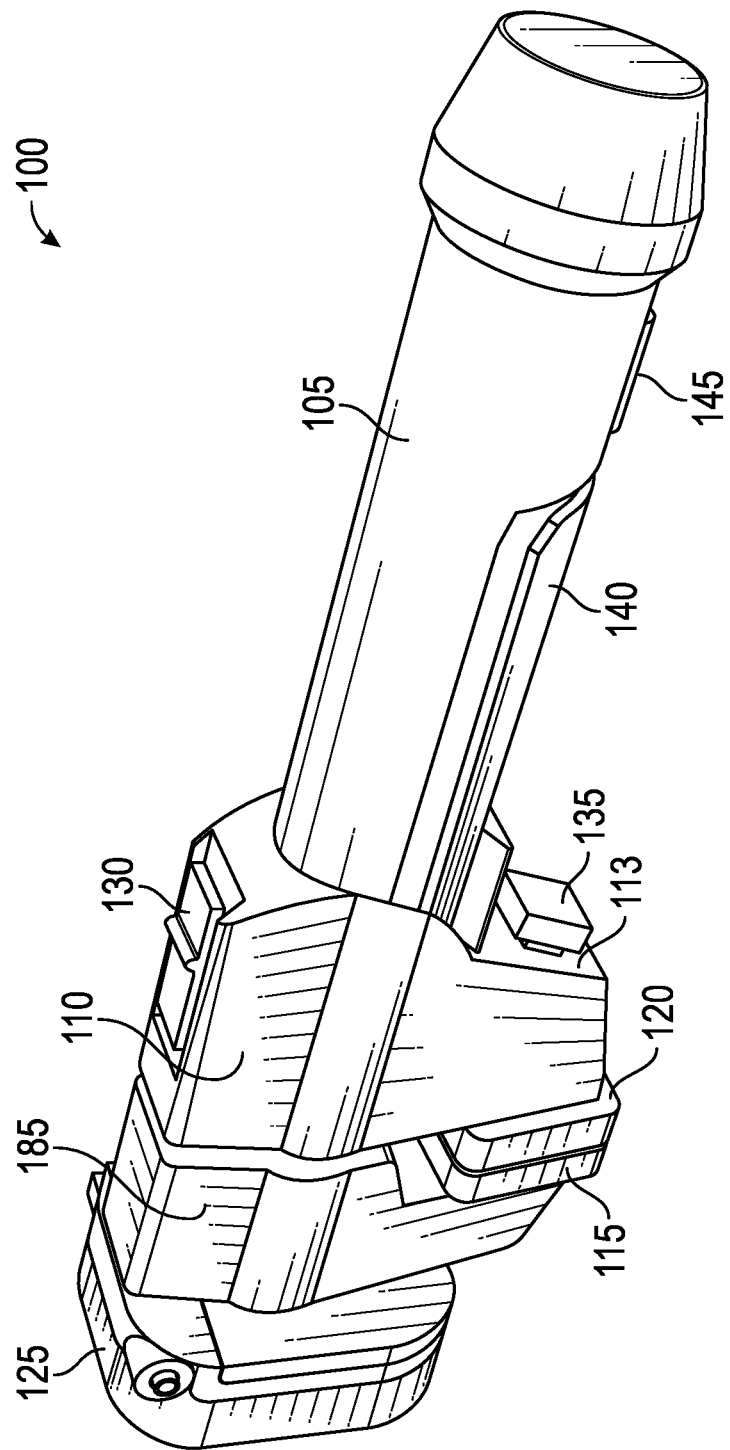
FIG. 2 is an alternate perspective view of the example flashlight clamp of FIG. 1A in the first state.
Figure 3:
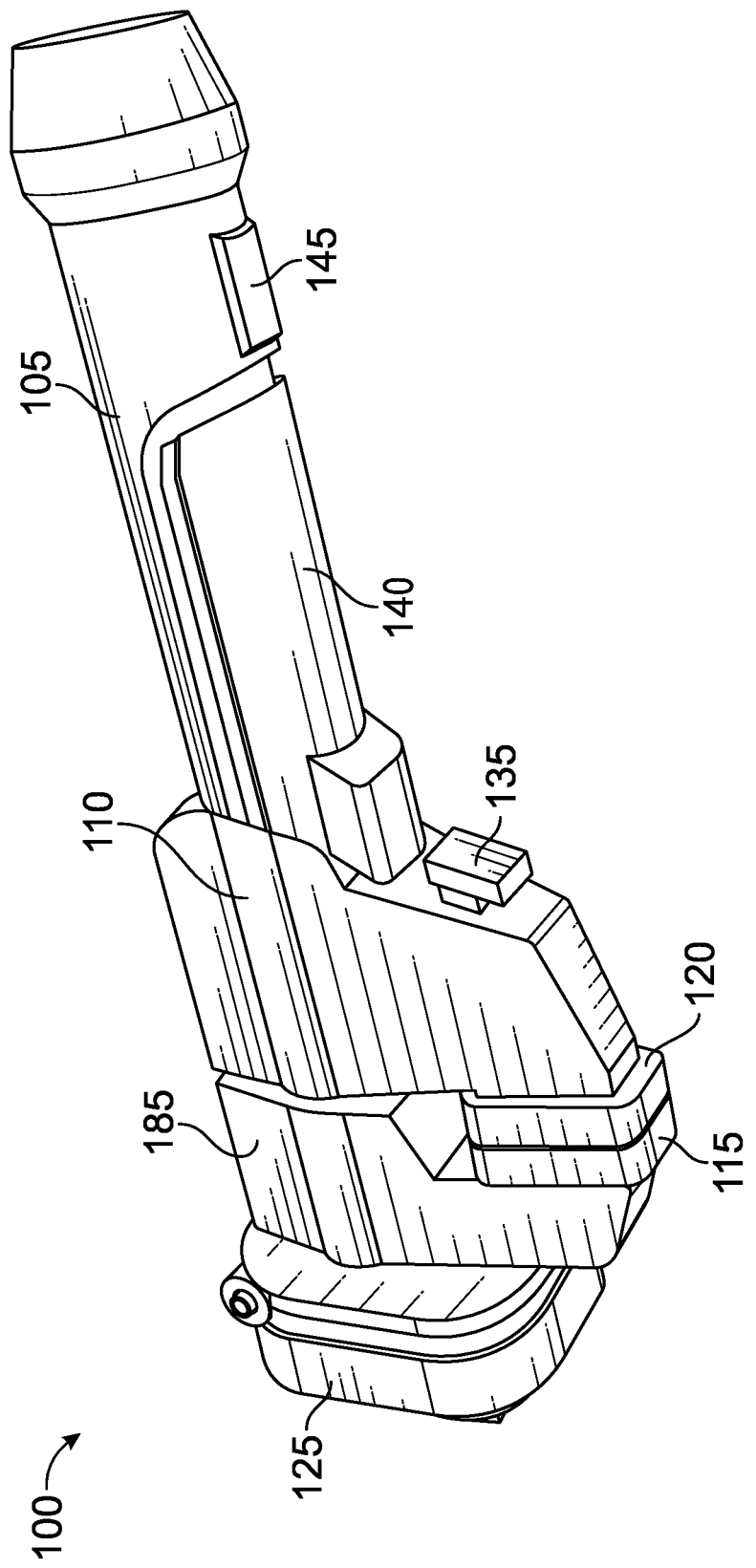
FIG. 3 is a bottom perspective view of the example flashlight clamp of FIG. 1A in the first state.

FIG. 1B illustrates the boundaries of various component parts of the flashlight clamp 100. The handle 105 extends from the proximal end of the flashlight clamp 100 to connect with the body 110. When the trigger handle 140 is in a closed position as shown in FIGS. 1A and 1B, a top surface of the trigger handle 140 lays flush against a cutout 190 of the handle 105. The trigger handle is illustrated in its open position and described below with respect to FIGS. 5 and 6. When the trigger handle 140 is in the closed position flush against the cutout 190, the trigger handle may be locked in place by the sliding tab 145. Additionally, when in the closed position, the trigger handle 140 and the handle 105 may together form a substantially cylindrical shape, providing a comfortable shape for a user to hold.

The distal end of the handle 105 is connected to a proximal end of the body 110. The body 110 includes a surface 111 on the side of the body 110. The surface 111 is bounded by a top surface 130, a distal surface 112 at a right angle with respect to the top surface 130, and a proximal surface 113 angled with respect to both the top and distal surfaces 130, 112. Accordingly, the surface 111 may be generally triangular in shape. A surface similar to the surface 111 is on the side of the body 110 that is opposite the surface 111 (not shown). In various embodiments, the body 110 and other elements of the flashlight clamp 100 may be shaped differently than shown in FIGS. 1A, 1B, 2-6 and 11.

Referring again to FIG. 1B, the proximal surface 113 of the body 110 may include one or more openings to accommodate the trigger handle 140 and the brake release button 135, which extend into a cavity of the body 110. The cavity of the body 110 may house a drive assembly and a braking assembly of the flashlight clamp 100 that are actuated at least in part by the trigger handle 140 and the brake release button, respectively. The drive assembly and the braking assembly are illustrated in and will be discussed with respect to FIGS. 12, 13A, 13B, and 14A-14D. In the example of FIG. 1B, an opening for the brake release button 135 is located on the proximal surface 113 of the body 110, at a location further from the handle 105 than the opening for the trigger handle 140. Stated another way, the opening for the trigger handle 140 is closer to the handle 105 than the opening for the brake release button 135. The opening for the brake release button 135 is also located generally opposite to where the second jaw 120 is attached to the distal surface 112 of the body 110.

The arm 185 is generally L-shaped when viewed from the side of the flashlight clamp 100, with an upper portion attached to the slide bar 155 that is wider than a lower portion attached to the first jaw 115. A distal surface 150 (indicated in FIG. 4) of the arm 185 is illustrated in FIGS. 1A, 1B, 2, and 3 with the light assembly 125 mounted thereon. As described herein, in various embodiments, the light assembly 125 may be mounted to any other surface of a flashlight clamp, such as other surfaces of the arm 185 and/or the body 110.

Figure 5:
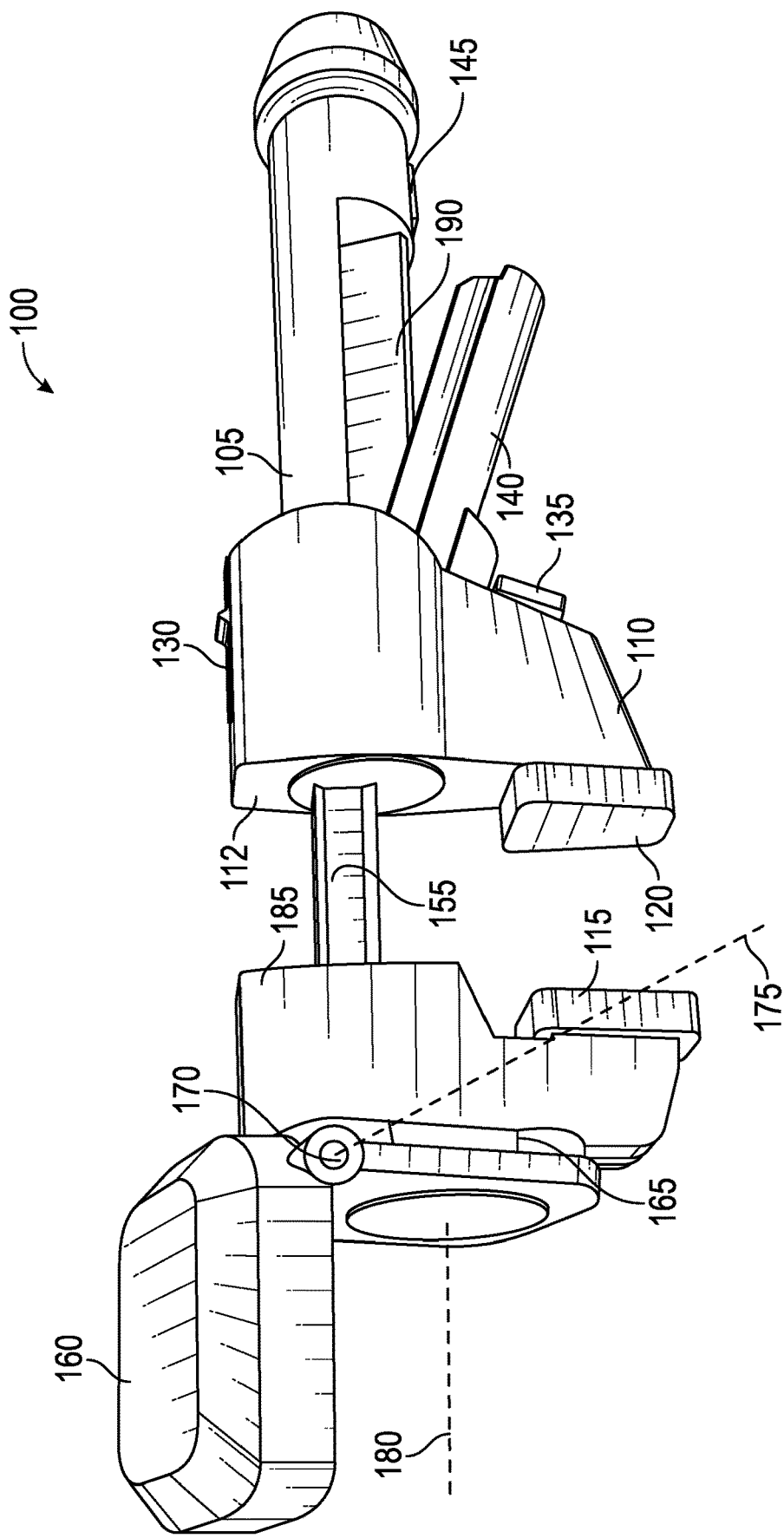
FIG. 5 is a side perspective view of the example flashlight clamp of FIG. 1A in a third state with the clamp opened, handle unlocked, and light assembly in the first position.
Figure 6:
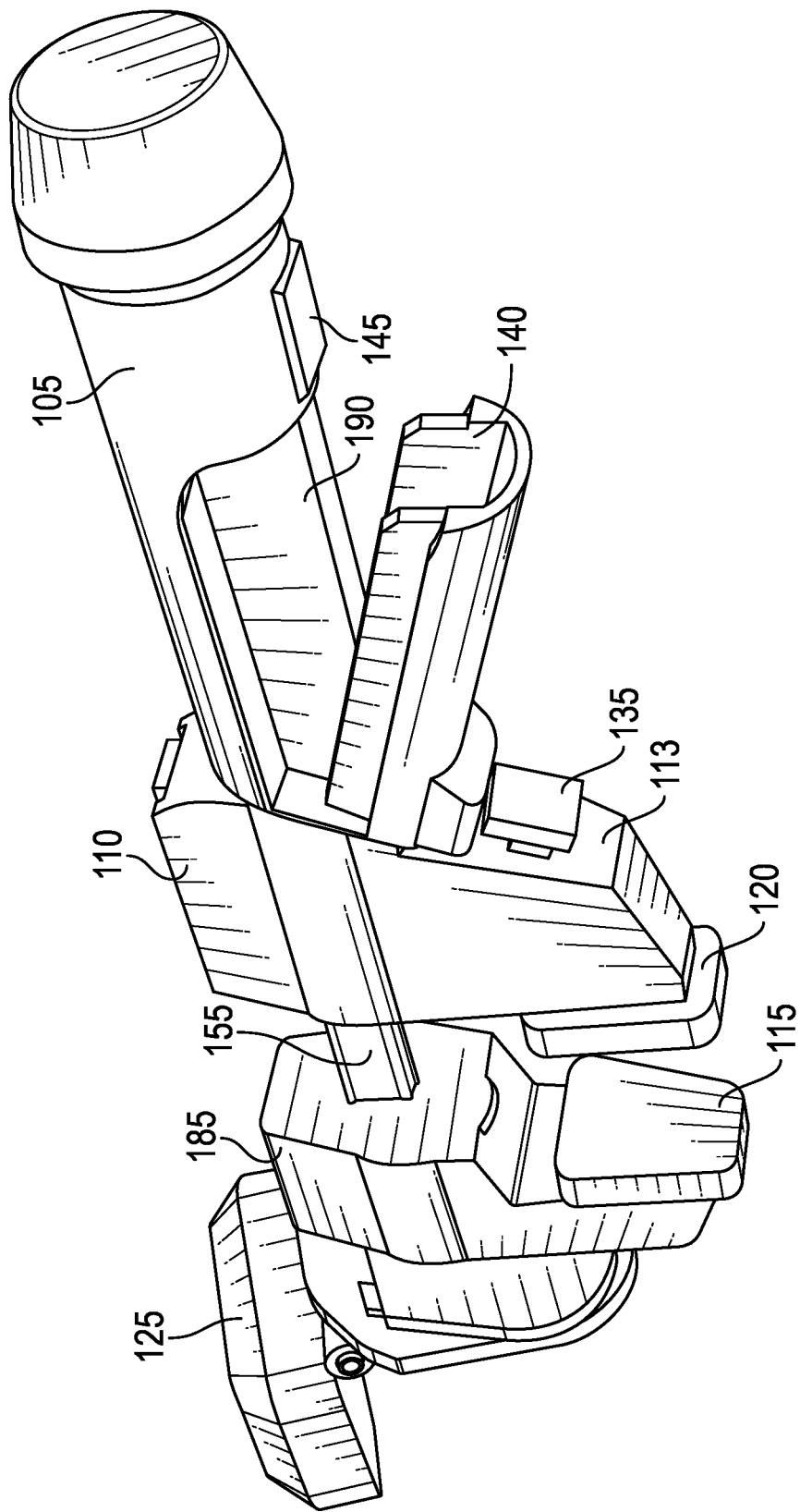
FIG. 6 is a bottom perspective view of the example flashlight clamp of FIG. 1A in the third state.

Referring to FIGS. 5 and 6, the slide bar 155 extends through the wider upper portion of the arm 185 and through an upper portion of the body 110 (including through the first portion 112). The slide bar 155 is fixed to the arm 185.

The lower portion of the arm 185 is connected to the first jaw 115 on a surface opposing the distal surface 150 of the arm 185. The L-shape of the arm 185 provides a space for the first jaw 115 and the second jaw 120 to come together, even when the arm 185 and the body 110 are right next to one another as shown in FIGS. 1A and 1B.

In the example of FIGS. 1A and 1B, the first jaw 115 and the second jaw 120 make up a clamping mechanism (which may be referred to herein as a clamp) for affixing the flashlight clamp 100 to an object. The flashlight clamp 100 may be attached to any object that can fit between the first jaw 115 and the second jaw 120 of the clamp by placing the object between the first jaw 115 and the second jaw 120 in an open state and closing the first jaw 115 and second jaw 120 to clamp to the object. In FIGS. 1A and 1B, the clamp is shown as closed with no object secured in the clamp. However, in other examples and/or embodiments, any object may be secured within the first jaw 115 and the second jaw 120, thereby securing the entire flashlight clamp 100 to the object. In this way, a user may advantageously secure the flashlight clamp 100 to an object to shine light in a desired location without requiring the user to hold onto the flashlight clamp 100.

Figure 4:
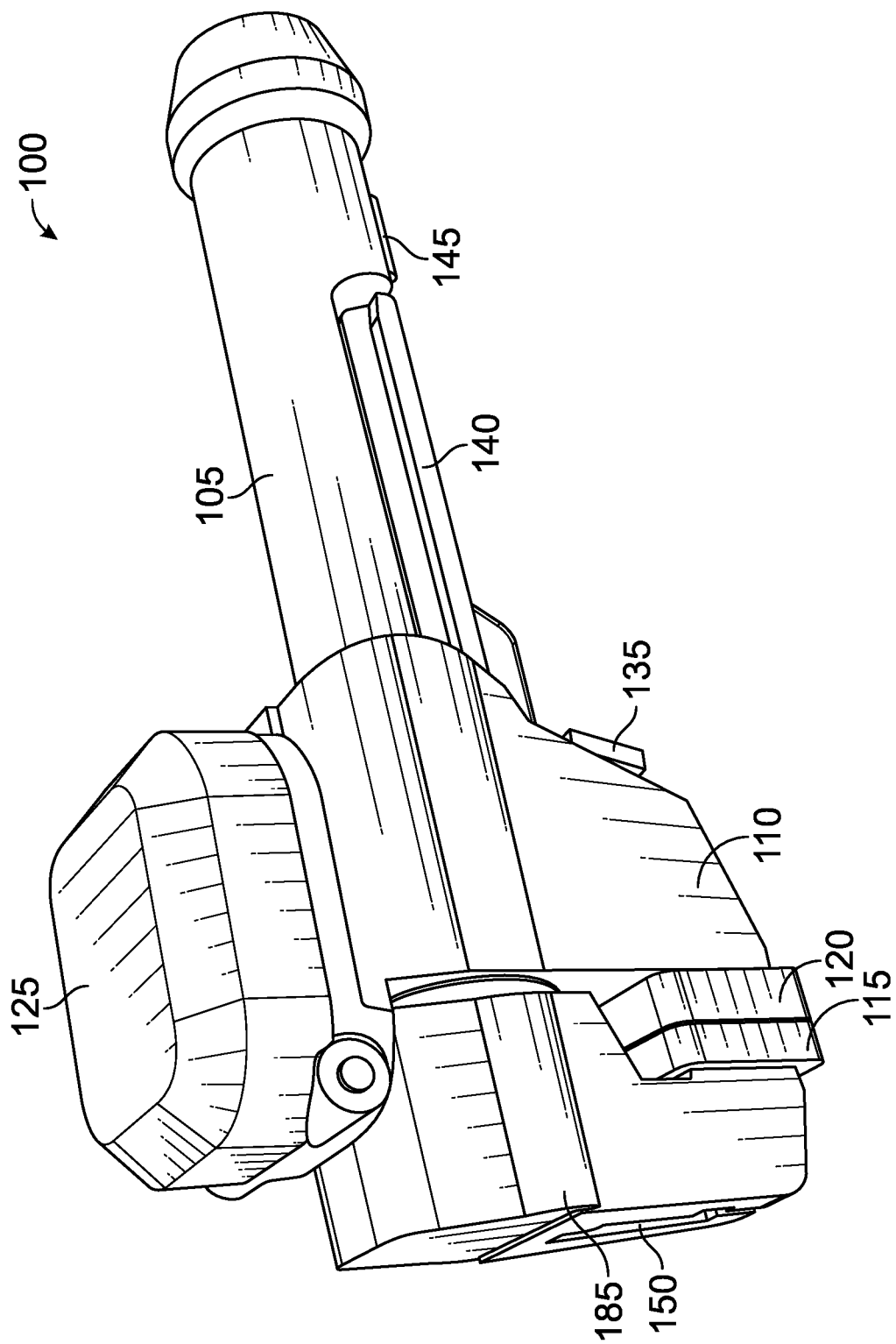
FIG. 4 is a perspective view of the example flashlight clamp of FIG. 1A in a second state with the clamp closed, handle locked, and the light assembly mounted in a second position.

The example light assembly 125 is configured to removably attach to the flashlight clamp 100 at least at two different positions on the flashlight clamp 100. FIGS. 1A and 1B illustrate the light assembly 125 attached to a first position, namely, a distal surface 150 of the arm 185. The light assembly 125 may be easily removed from the first position without the use of tools (e.g., by hand) and attached to other positions on the flashlight clamp 100. The light assembly 125 may also be attached to the body 110 at a second position, namely, the top surface 130 of the body 110, as shown in FIG. 4. Referring to FIGS. 1A, 1B, and 4, the distal surface 150 of the arm 185 is substantially perpendicular to the top surface 130 of the body 110. In this way, the light assembly 125 may be mounted in different places on the clamp such that light from the light assembly 125 may originate from and be directed to locations appropriate for many different settings. For example, the orientations required to attach to the clamp to an object may be limited in some scenarios. However, even if the orientation and possible placement of the clamp is limited, the light assembly 125 may be mounted to different locations/positions on the flashlight clamp 100 that face different directions and/or are arranged differently with respect to the object to which the clamp flashlight 100 is secured so that the user may advantageously point the light assembly 125 as desired.

Although the surfaces 130, 150 to which the light assembly 125 may be coupled are described above as being perpendicular to each other, such description is an example only. In various other embodiments, the surfaces where the light assembly 125 mounts on a clamp may have a relationship other than being substantially perpendicular to one another. In addition, although two mounting surfaces 130, 150 are described above, in various other embodiments, a clamp may have more than two surfaces to which the light assembly 125 may be mounted. For example, a clamp may have three different surfaces to which the light assembly 125 may be mounted that are each substantially perpendicular to one another. In various embodiments, the surface 111 may function as a third mounting surface to which the light assembly 125 may be mounted. Similarly, a side surface 186 (indicated in FIG. 1B) of the arm 185 that is perpendicular to both the top surface 130 of the body 110 and the distal surface 150 of the arm 185 may function as a mounting surface, or a mirrored surface on the opposite side of the arm 185. In various embodiments, a clamp may have surfaces to which the light assembly 125 may be attached that are at any other angle with respect to each other from zero (0) to ninety (90) degrees (e.g., five (5) degrees, ten (10) degrees, fifteen (15) degrees, twenty (20) degrees, twenty-five (25) degrees, thirty (30) degrees, thirty-five (35) degrees, forty (40) degrees, forty-five (45) degrees, fifty (50) degrees, fifty-five (55) degrees, sixty (60) degrees, sixty-five (65) degrees, seventy (70) degrees, seventy-five (75) degrees, eighty (80) degrees, eighty-five (85) degrees).

The light assembly 125 may couple to the flashlight clamp 100 in different ways. For example, the light assembly 125 may include one or more magnets, such that a magnetic force between the one or more magnets of the light assembly 125 and a magnet and/or ferromagnetic material of the flashlight clamp 100 causes the light assembly 125 to attach to the flashlight clamp 100. In various embodiments, the light assembly 125 may not have a magnet, but instead may have a ferromagnetic material such that a magnet of the flashlight clamp 100 and the ferromagnetic material of the light assembly 125 causes the magnetic force to attach the light assembly 125 to the flashlight clamp. Other methods of attaching the light assembly 125 to the flashlight clamp 100 may also be used, such as an interference fit between a portion of the light assembly 125 and a portion of the flashlight clamp 100.

The example light assembly 125 may include a magnet such that the light assembly 125 is removably attachable to a surface comprising a ferromagnetic metal. In other words, the light assembly 125 may be attached to a surface made up in whole or in part by a ferromagnetic material when the light assembly 125 is removed from the clamp. In this way, a user may advantageously use the light assembly 125 to attach to a surface without use of the clamp. The magnetic force between the magnet of the light assembly 125 and the ferromagnetic metal of the surface affixes the light assembly 125 to the surface, such that, when switched on, the light can be directed in a desired direction without being held by the user. An example of a light assembly attached to a surface with ferromagnetic metal is illustrated in and will be described with respect to FIGS. 7-10.

The handle 105, as well as the trigger handle 140, are advantageously shaped to be easy to grip for a user. The handle 105 of FIGS. 1A, 1B, 2-6, and 11 has a generally cylindrical body extending longitudinally from a proximal end to a distal end, with a cylindrical portion at the proximal end that has a wider diameter than the longitudinally center portion of the handle 105. Furthermore, a proximal-most portion of the body 110, to which the distal end of the handle 105 is coupled, is wider than the center portion of the handle 105. Accordingly, a user may easily grasp the center portion of the handle 105 without the flashlight clamp 100 slipping out of the user's hand because either end of the handle 105 is wider than the center portion or is coupled with a structure that is wider than the center portion of the handle 105.

In the example flashlight clamp 100, the trigger handle 140 is shaped such that the user may easily grasp the handle 105 and the trigger handle 140 at the same time with the same hand, and squeeze both to cause the trigger handle 140 to move toward the handle 105. Because of the shape of the handle 105 and the trigger handle 140, the trigger handle 140 fits into the cutout 190 of the handle 105. In this way, the handle 105 and the trigger handle 140 together are shaped somewhat like a traditional flashlight with a cylindrical handle. Because of the convenient shape of the handle 105 and the trigger handle 140, the flashlight clamp 100 is easily transportable by a user, and, with the light assembly 125 turned on, may even be used in a similar manner to a traditional flashlight.

Referring to FIGS. 1A, 1B, 2-6, and 11, the brake release button 135, when pressed by the user, releases a braking assembly so that the jaws 115, 120 of the clamp may be separated from one another. The braking assembly is illustrated in and will be discussed with respect to FIGS. 12, 13A, 13B, and 14A-14D.

The trigger handle 140 may be disposed on a lower surface of the handle 105. The sliding tab 145 is configured to selectively lock or unlock the position of the trigger handle 140 responsive to user actuation of the sliding tab 145. The sliding tab 145 is movable between a first position and a second position. In the first position, the sliding tab 145 does not interfere with movement of the trigger handle 140. In the second position, the sliding tab 145 locks the trigger handle 140 in place flush against the handle 105 of the flashlight clamp 100 (provided that the trigger handle 140 has been moved to be flush with the handle). Another example of the operation of a trigger handle and a sliding tab is illustrated in and will be discussed with respect to FIGS. 12, 13A, 13B, and 14A-14D.

The sliding tab 145, in various embodiments, may include a detent to bias into either the open (non-locking) or the closed (locking) position. If the detent is positioned such that the sliding tab 145 is biased toward the open (non-locking) position, the sliding tab 145 biases in a proximal direction of the flashlight clamp 100, and interaction with the trigger handle 140 causes the sliding tab 145 to lock the trigger handle 140 in place as well as causes the trigger handle 140 to keep the sliding tab 145 from biasing back into the open (non-locking) position without force applied by the user. If the detent is positioned such that the sliding tab 145 biases into the closed (locking position), the sliding tab 145 biases in a distal direction of the flashlight clamp 100, and interaction between the sliding tab 145 and the trigger handle 140 as the trigger handle 140 is brought toward the handle 105 causes the sliding tab 145 to lock to the trigger handle 140 in place against the handle 140 once the trigger handle 140 is moved to a position that is flush with the handle 105.

The slide bar 155 (shown in FIGS. 5 and 6) connects the body 110 of the flashlight clamp 100 to the arm 185 and the first jaw 115. In the illustrated embodiment, the slide bar 155 is permanently affixed to the arm 185, but is slidably connected to the body 110, so that the slide bar is movable to open/close the clamp (e.g., separate or draw together the first jaw 115 and the second jaw 120). The slide bar (and the body 110 and the first jaw 115 along with the slide bar 155) is movable by a drive assembly, which is partially located in the body 110 (the components of the drive assembly that are inside the body 110 are not visible in FIGS. 1A and 1B, but are illustrated in and will be discussed with respect to FIGS. 12, 13A, 13B, and 14A-14D). The drive assembly also includes the trigger handle 140 that is visible in FIGS. 1A and 1B. The trigger handle 140 is pivotally connected to the body 110, and is actuated to cause the drive assembly to move the slide bar 155, as well as the arm 185 and the first jaw 115, in a proximal direction (e.g., toward the proximal end of the flashlight clamp 100). In the configuration of FIGS. 1A and 1B, the light assembly 125 is removably attached to the arm 185 at the most distal end of the flashlight clamp 100.

FIG. 4 is a perspective view of the example flashlight clamp of FIG. 1A in a second state with the clamp closed, handle locked, and the light assembly 125 mounted in a second position. The flashlight clamp 100 in FIG. 4 has the light assembly 125 mounted on an alternate position (e.g., the top surface 130 of the body 110 in FIG. 1A). The flashlight clamp 100 also includes an alternate mounting position at the distal surface 150 of the arm 185 where the light assembly 125 may be mounted generally perpendicular to the mounting position where the light assembly 125 is in FIG. 4. The light assembly 125 mounts to the top surface 130 of the body 110 in a similar manner as the light assembly 125 mounts to the distal surface 150 of the arm 185 of the flashlight clamp 100.

FIGS. 5 and 6 are perspective views of the example flashlight clamp 100 in a third state, namely, with the clamp open and trigger handle 140 open. In the third state, the first jaw 115 and the second jaw 120 are separated from each other—thus, the clamp is open. As shown in FIGS. 5 and 6, the flashlight clamp 100 includes a slide bar 155 which is rigidly coupled to the arm 185 and movable with respect to the body 110. As described further herein, when a user grips the handle 105 and actuates the trigger handle 140 toward the handle 105, a drive assembly moves the slide bar 155, the arm 185, and the first jaw 115 toward the handle 105 and the body 110, and thus moves the first jaw 115 so as to reduce the distance between the first jaw 115 and the second jaw 120.

Referring to FIG. 5, the light assembly 125 includes a light source portion 160, a base portion 165, and an attachment portion (not visible in FIG. 4). The light source portion 160 and the base portion 165 may be connected by a hinge 170. The hinge 170 allows the light source portion 160 to rotate about an axis 175 relative to the base portion 165. In this way, the light source portion 160 may be advantageously directed in various directions to provide light in different ways as desired by a user. The light source portion 160 includes a light such as one or more light emitting diodes (LEDs). The LEDs may be powered, for example, by batteries stored in the light source portion 160 of the light assembly 125.

An attachment portion (not visible in FIG. 5) removably attaches the light assembly to the clamp as described herein. The base portion 165 rotates with respect to the attachment portion about an axis 180.

In the example embodiment of FIG. 5, the axis 175 is substantially perpendicular to the axis 180. In this way, the light may be oriented in a variety of different directions. The hinge 170 and the rotation mechanism between the base portion 165 and the attachment portion may also have detents, such that the light source portion 160 may remain in a desired orientation as desired by the user. Accordingly, the detents of the hinge 170 may lock the light source portion 160 into at least two different angular positions with respect to the base portion 165. Similarly, the detents of the rotation mechanism between the base portion 165 and the attachment portion may lock the base portion 165 in at least two different rotational positions with respect to the attachment portion. In both examples, the detents may be configured such that the light source portion 160 and/or the base portion 165 move again (or become unlocked) in response to torque applied by the user, whether applied with respect to the axis 175 to overcome a detent of the hinge 170 or applied with respect to the axis 180 to overcome a detent of the rotation mechanism. In various embodiments, the hinge 170 and/or the rotation mechanism may have more than two detents such that more than two positions may be maintained at each of the hinge 170 and/or the rotation mechanism. For example, one or both of the hinge 170 and the rotation mechanism may enough detents to maintain three (3), four (4), five (5), six (6), seven (7), eight (8) or more positions.

Figure 15A:
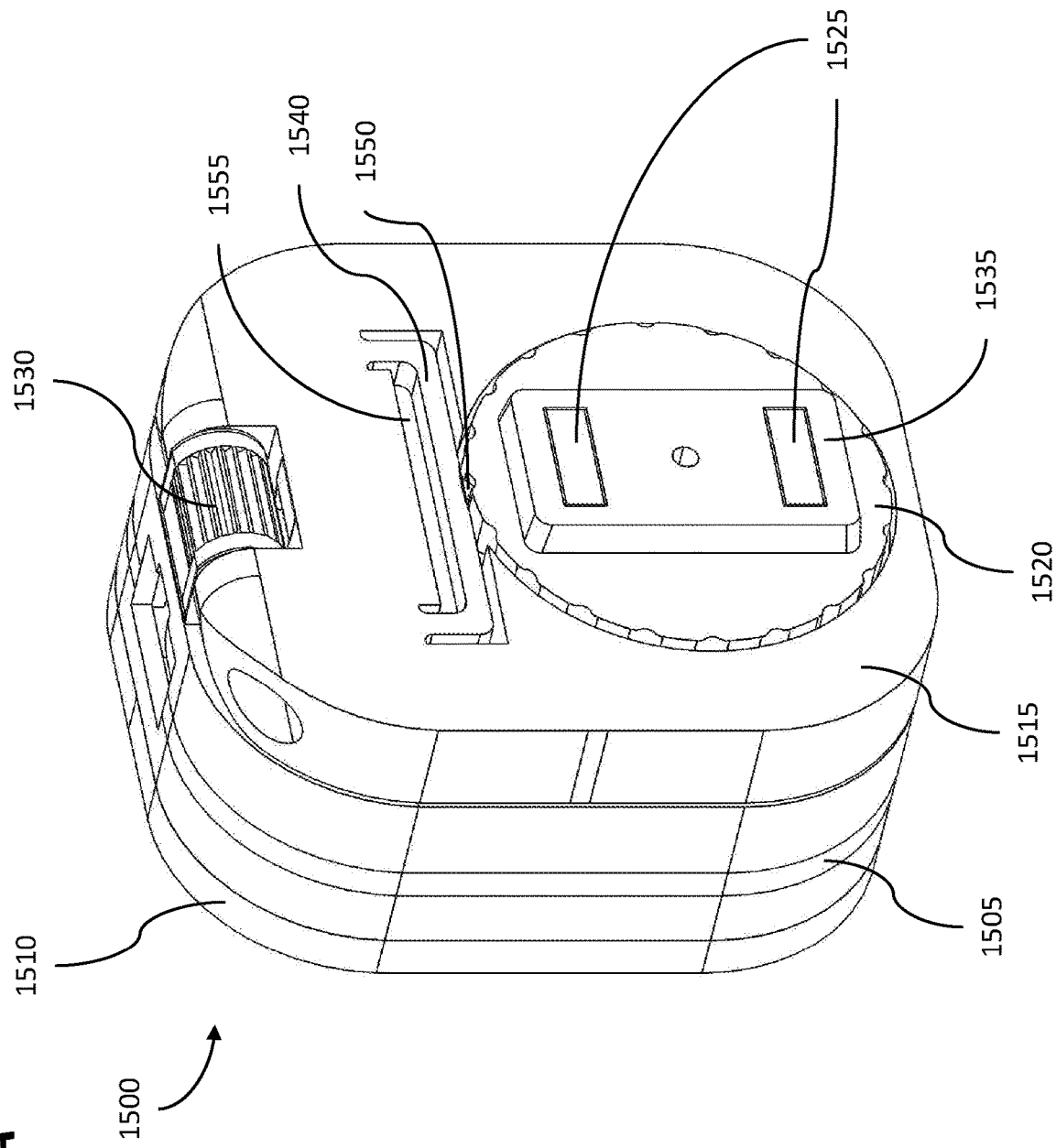
FIG. 15A is a perspective view of an example light assembly.
Figure 15B:
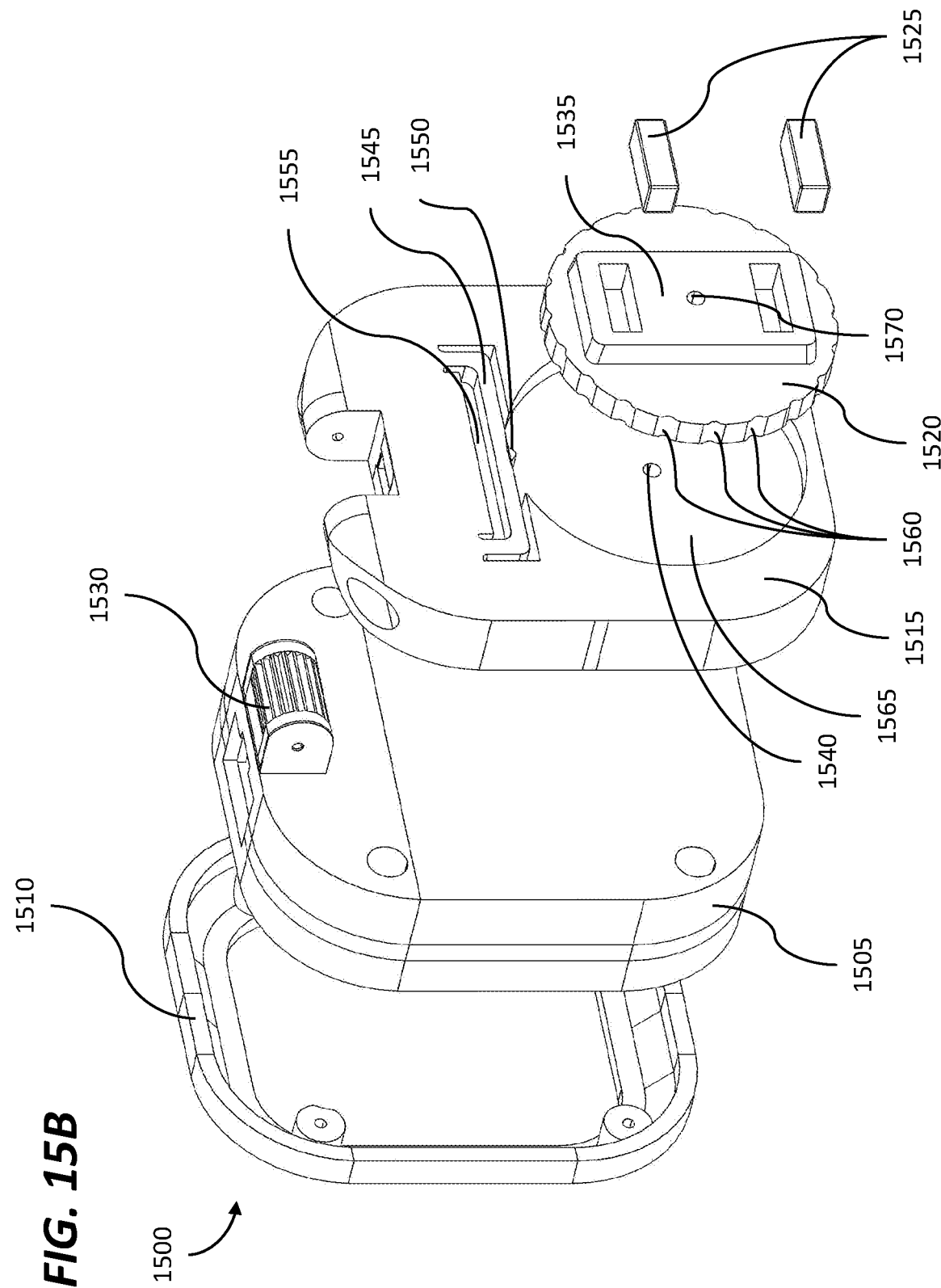
FIG. 15B is a partially-exploded perspective view of the example light assembly of FIG. 15A.

FIG. 15A is a perspective view of an example light assembly 1500 that may, for example, be similar to and used in a similar way as the light assembly 125 of FIGS. 1-6. FIG. 15B is a partially-exploded perspective view of the example light assembly 1500 of FIG. 15A. The light assembly 1500 includes a light source portion 1505 and a base portion 1515. The light source portion 1505 and the base portion 1515 are connected by a hinge 1530, such that the light source portion 1505 may move with respect to the base portion 1515. For example, the hinge 1530 may permit movement about an axis of the hinge 1530, which may be similar to the axis 175 of FIG. 5. The hinge 1530 may also include a detent or ratchet mechanism that keeps the light source portion 1505 in the same relative position with respect to the base portion 1515 as described herein. A transparent light cover 1510 may be affixed to the light source portion 1505 such that light may pass through transparent portions of the light cover 1510. The light cover 1510 may be permanently or semi-permanently attached to the light source portion 1505.

The base portion 1515 may include an example detent mechanism that allows, when the light assembly 1500 is attached to a flashlight clamp as described herein, the light assembly 1500 to rotate, for example about an axis similar to the axis 180 shown in FIG. 5. The detent mechanism includes an opening 1565 in the base portion 1515 configured for a wheel portion 1520 to rotate therein. The wheel portion 1520 may attach to the base portion 1515 and rotate in the opening 1565 via a pin, screw, or other mechanism that defines an axis of rotation of the wheel portion 1520 that passes through a hole 1540 of the base portion 1515 and a hole 1570 of the wheel portion 1520.

Notches 1560 located around the circumference of the wheel portion 1520 are configured to receive a pin 1550 of the base portion 1515. The pin 1550 fits into the notches 1560 to hold the wheel portion 1520 in place unless sufficient rotational force is applied to cause a bar 1545, to which the pin 1550 is connected, to deflect such that the wheel portion 1520 may rotate and the pin 1550 moves into another of the notches 1560. The bar 1545 is able to deflect because the back side of the bar 1545 (not pictured) is not integrally connected to the base portion 1515, and a space 1555 exists between the top of the bar 1545 and the base portion, so that the bar 1545 is only attached to the base portion 1515 at its two ends. Although the detent mechanism has been described with respect to the wheel portion 1520 moving within the opening 1565, the wheel portion 1520 may also be stationary while the base portion 1515 and the rest of the light assembly rotates around the wheel portion 1520. In either case, the detent mechanism functions similarly.

Figure 10:
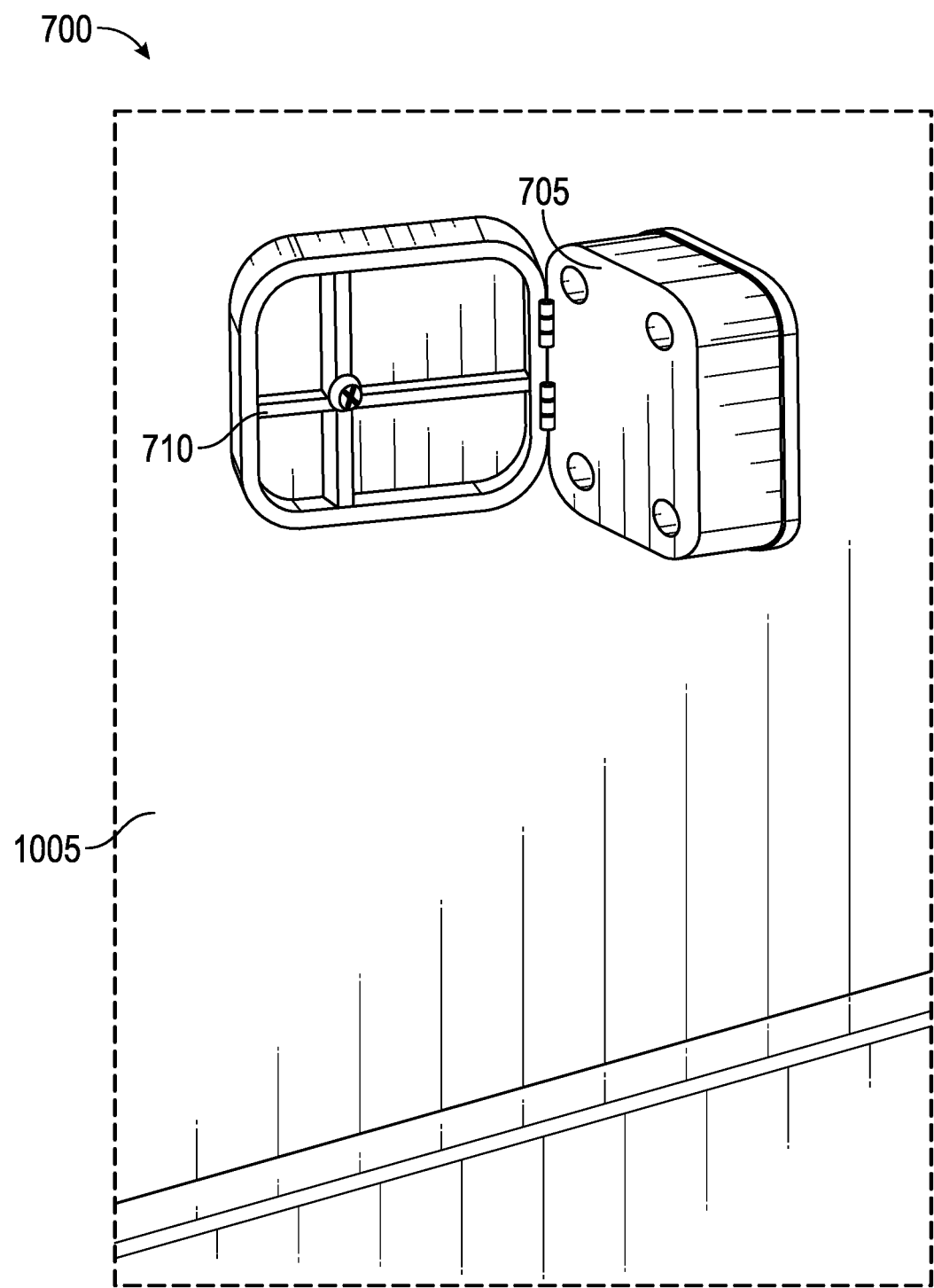
FIG. 10 is a perspective view of the example light assembly of FIG. 7 mounted on a surface of ferromagnetic material.

Attached to the wheel portion 1520 is a magnet portion 1535. The magnet portion 1535 is rectangularly shaped, though in various embodiments may be in other shapes. A mounting location for the light assembly 1500 on a flashlight clamp may have a recess that corresponds to the shape of the magnet portion 1535 (whether rectangular or otherwise), such that the magnet portion 1535 may rest in such a recess when the light assembly is mounted to the flashlight clamp. A magnet or ferromagnetic material may exist on or at the bottom surface of the recess such that a magnetic force between magnets 1525 and the flashlight clamp causes the light assembly 1500 to be mounted to the flashlight clamp. The shape of the magnet portion corresponding to the recess in the flashlight clamp prevents the wheel portion 1520 from rotating when a user, for example, rotates the base portion 1515 of the light assembly 1500. In this way, in combination with the detent mechanism, the light assembly 1500 may attach to a flashlight clamp and the base portion 1515 of the light assembly 1500 may be rotated with respect to the flashlight clamp to direct light as desired. In the light assembly 1500, the magnet portion 1535 is permanently affixed to the wheel portion 1520, and the magnet portion 1535 includes two recesses to receive the magnets 1525, which are permanently affixed to the magnet portion 1535 and the wheel portion 1520. The two magnets 1525 may be located apart from one another to secure the light assembly 1500 to a flashlight clamp or other object. By having to magnets spaced apart as shown in FIGS. 15A and 15B, two separate magnetic forces may be created to strengthen an attachment. When the light assembly 1500 may be attached to a surface that does not have a recess corresponding to the shape of the magnet portion 1535 (e.g., when attached to a refrigerator door as illustrated in FIG. 10 and further discussed below), the multiple magnets may create magnetic forces that prevent the light assembly 1500 from rotating without force being applied from a user.

Figure 7:
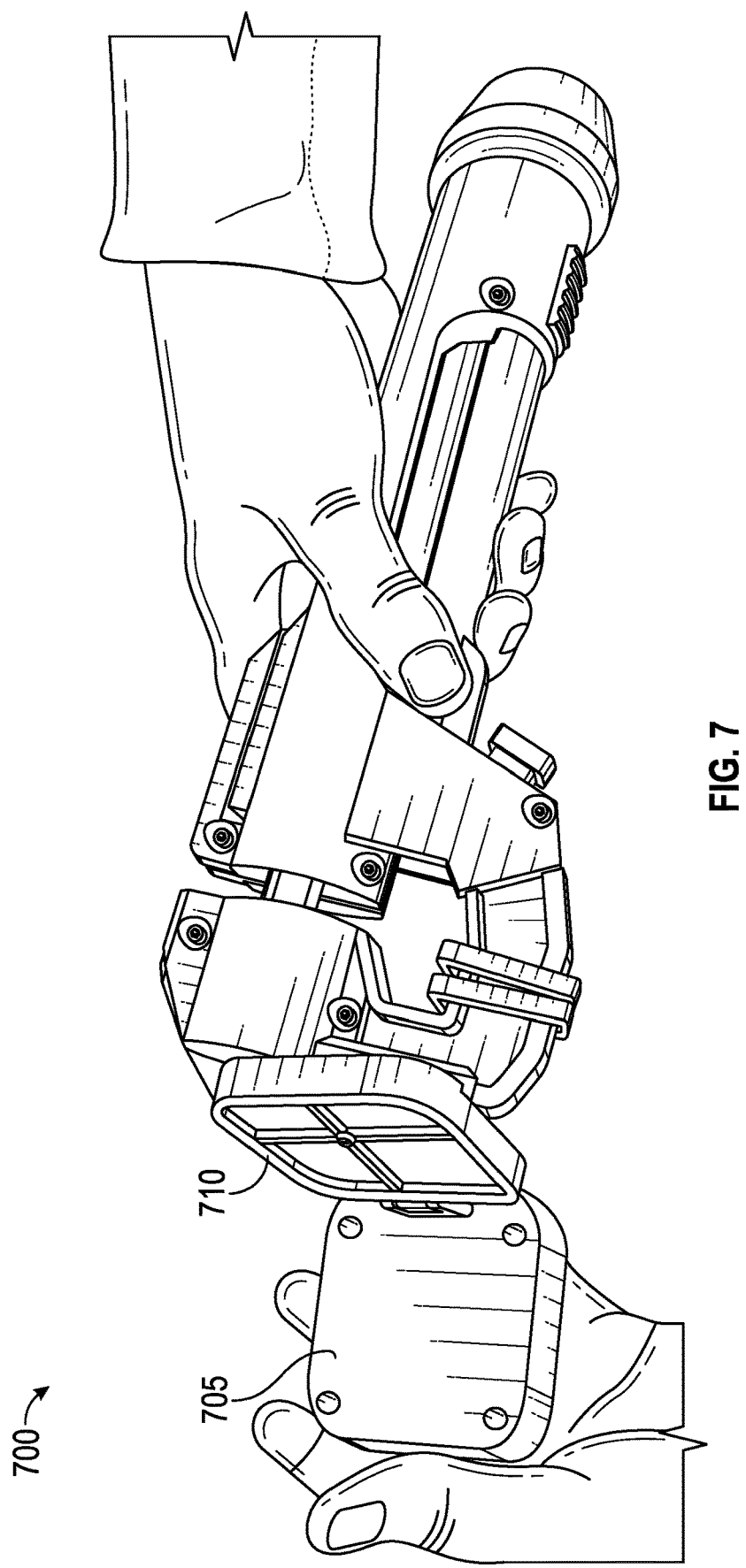
FIG. 7 is side perspective view of an example flashlight clamp with a light assembly in a first orientation.

FIG. 7 is side perspective view of an example flashlight clamp with a light assembly in a first orientation. Flashlight clamp 700 includes a light source portion 705 and base portion 710 of a light assembly, which are rotated as compared to the light assembly of FIGS. 5 and 6. In particular, the base portion 710 is rotated with respect to the attachment portion approximately ninety (90) degrees from the orientation shown in FIGS. 5 and 6.

Figure 8:
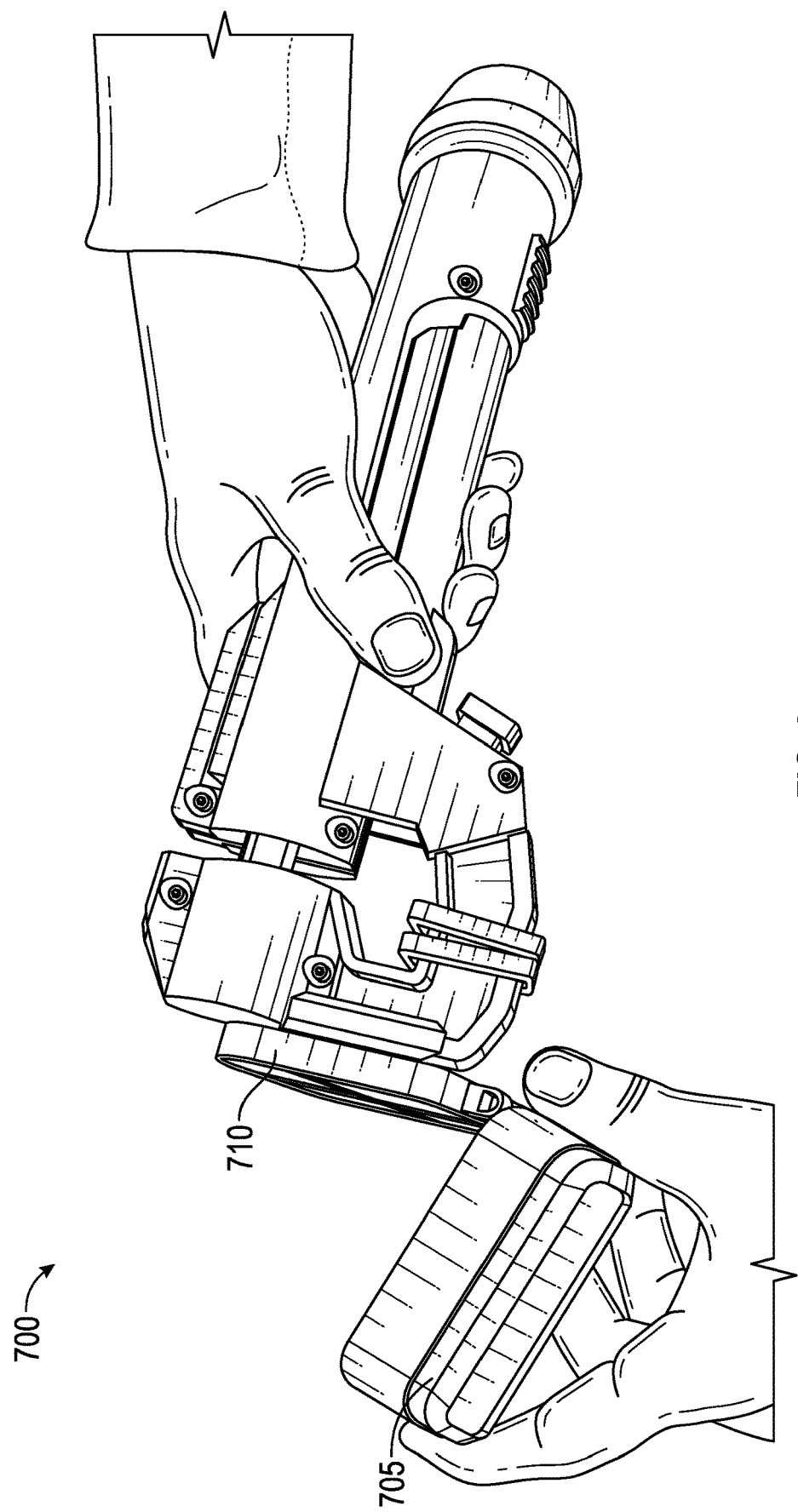
FIG. 8 is side perspective view of the example flashlight clamp of FIG. 7 with the light assembly in a second orientation.

FIG. 8 is side perspective view of the example flashlight clamp 700 of FIG. 7 with the light assembly in a second orientation. In the second orientation illustrated in FIG. 8, the light source portion 705 is slightly rotated relative to base portion 710 around a hinge as compared to FIG. 7. In addition, in the second orientation, the base portion 710 is rotated approximately ninety (90) degrees from the position shown in FIG. 7.

Figure 9:
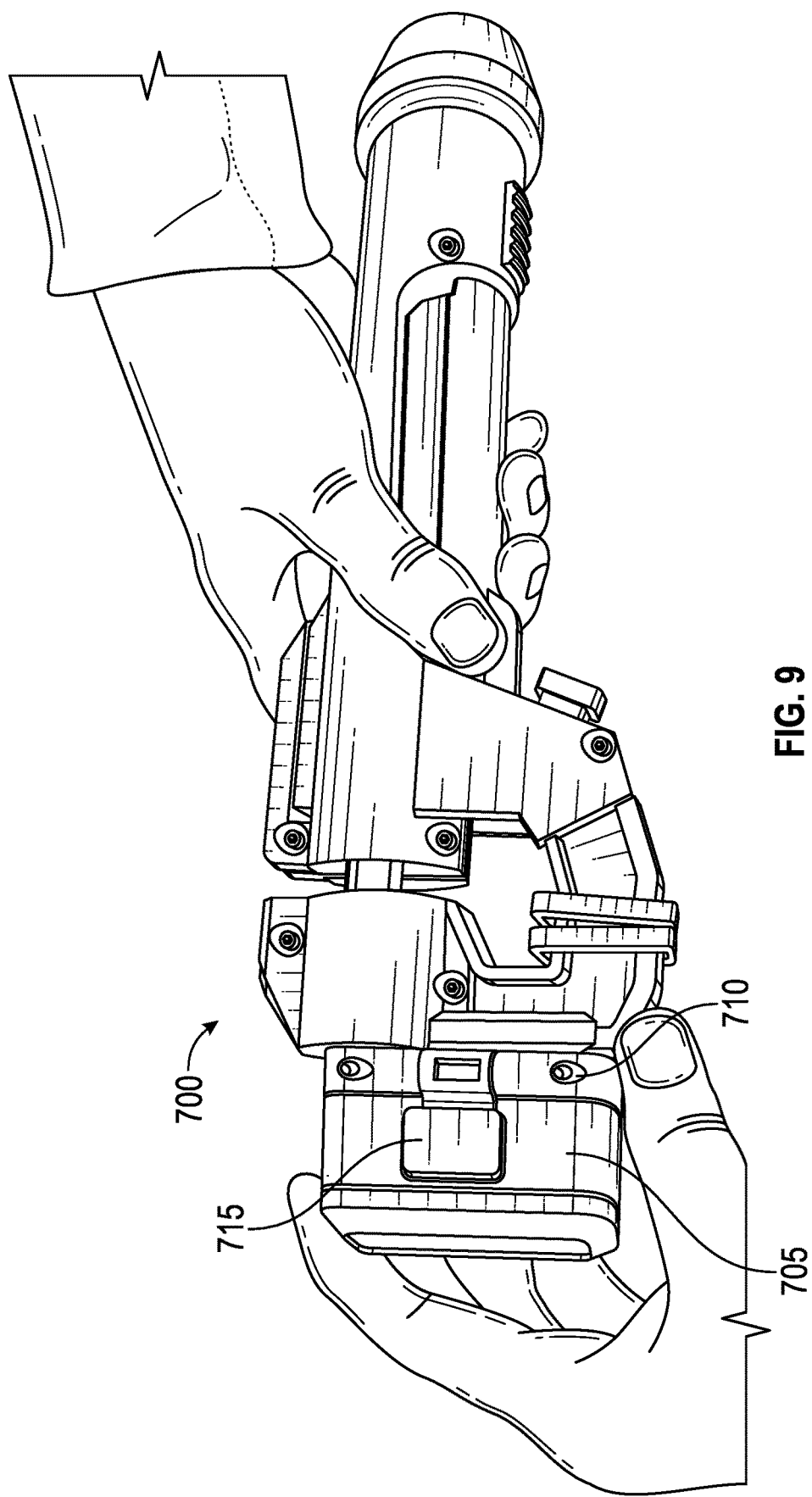
FIG. 9 is side perspective view of the example flashlight clamp of FIG. 7 with the light assembly in a third orientation.

FIG. 9 is side perspective view of the example flashlight clamp 700 of FIG. 7 with the light assembly in a third orientation. In the third orientation illustrated in FIG. 9, the light source portion 705 and base portion 710 are rotated an additional ninety (90) degrees with respect to the clamp from the position shown in FIG. 8. The base portion 710 is capable of rotating a full three hundred sixty (360) degrees with respect to the attachment portion of the light assembly (and subsequently the clamp). The light source portion 705 has also been rotated about a hinge as compared to FIGS. 7 and 8. A switch 715 is also shown on the light source portion 705. Actuation of the switch causes one or more light sources in the light source portion 705 to turn on/off and/or switch light modes. In various embodiments, actuation of the switch 715 may cause the one or more light sources to switch lighting modes such as a blinking mode, steady on mode, low power mode, high power mode, etc.

FIG. 10 is a perspective view of the example light assembly 700 of FIG. 7 mounted on an example surface comprising ferromagnetic material. The light assembly 700 is mounted on a refrigerator door 1005 in FIG. 10. A force between a magnet in the base portion 710 and the ferromagnetic material of the refrigerator door 1005 affixes the light assembly 700 to the refrigerator door 1005. The magnetic force is strong enough that the light assembly 700 remains stationary on the refrigerator door 1005, but not so strong that the light assembly 700 cannot be easily removed from the refrigerator door 1005 by the user and/or rotated to different orientations on the refrigerator door 1005. The magnetic force may be strong enough that the light assembly 700 may be oriented in different ways without slipping, rotating, etc. on the refrigerator door 1005. The light source portion 705 of the light assembly 700 is shown in FIG. 10 rotated around a hinge to point light in a direction approximately parallel to the refrigerator door 1005 surface.

Figure 11:
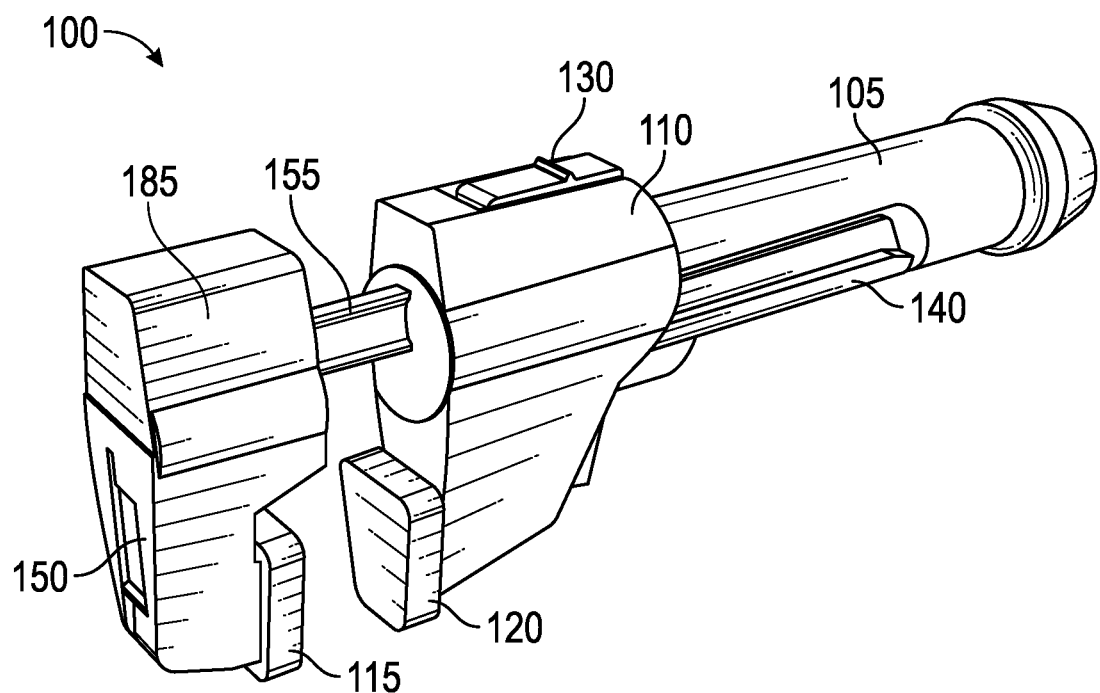
FIG. 11 is a perspective view of the example flashlight clamp of FIG. 1A with no light assembly attached.

FIG. 11 is a perspective view of the example flashlight clamp 100 with no light assembly attached. In such a configuration, the clamp still functions, and the flashlight clamp 100 may be attached to objects, or may also be used as a standard clamp to clamp two objects together.

Figure 12:
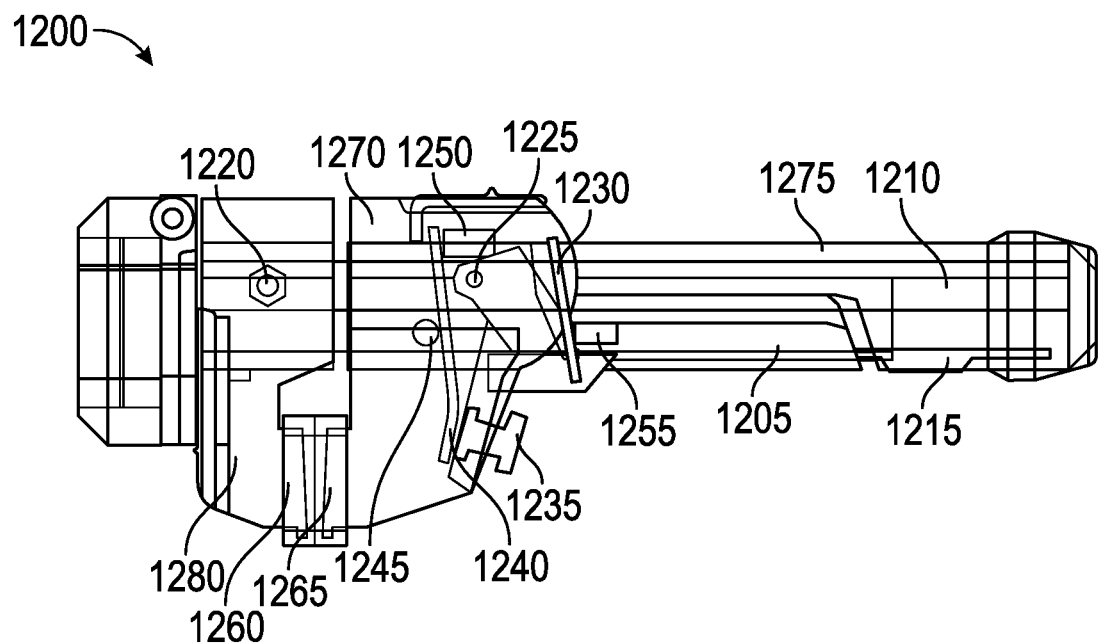
FIG. 12 is a cross section of an example flashlight clamp.

FIG. 12 is a cross section of an example flashlight clamp 1200. The clamp of the flashlight clamp 1200 includes a slide bar 1210 that has a first (distal) end and a second (proximal) end. A first jaw 1260 is coupled to an arm 1280, which is coupled to the distal end of the slide bar 1210 at a point 1220, and the slide bar 1210 and the arm move with respect to a second jaw 1265 and a body 1270. In this way, when the drive assembly moves the slide bar 1210, the drive assembly also pulls the first jaw 1260 toward the second jaw 1265. As shown in FIG. 12, a handle 1275 of the flashlight clamp 1200 is hollow such that the slide bar 1210 may move within the handle 1275. In this way, as the clamp is drawn closed the slide bar 1210 moves further proximal into the handle 1275. That the slide bar 1210 may move within the handle 1274 may also keep a proximal end of the slide bar 1210, as well as significant other portions of the slide bar 1210, from ever being exposed, protecting a user from pinch points and the slide bar 1210 from damage.

The body 1270 slidably receives the slide bar 1210, such that the slide bar 1210 may move with respect to the body 1270. The body 1270 is coupled to a distal end of the handle 1275. The distal end of the body 1270 is connected to the second jaw 1265. The second jaw 1265 opposes the first jaw 1260, such that as the drive assembly pulls the slide bar 1210, the first jaw 1260 and the second jaw 1265 are drawn together as the slide bar 1210 moves with respect to the body 1270.

The flashlight clamp 1200 includes a drive assembly for moving the slide bar 1210 in a first direction to move the first jaw 1260 and the second jaw 1265 together. The drive assembly includes a driving lever 1230, a spring 1255, and a trigger handle 1205.

The driving lever 1230 is a plate with a generally rectangular shape. In FIG. 12, a narrow side of the plate-shaped driving lever 1230 is visible. The driving lever 1230 moves between a first position and a second position when actuated by movement of the trigger handle 1205. In moving between the first position and the second position, the driving lever 1230 becomes frictionally engaged with the slide bar 1210 to move the slide bar 1210, and subsequently the arm 1280 and the first jaw 1260 toward the second jaw 1265 to close the clamp.

The driving lever 1230 defines an aperture through which the slide bar 1210 extends and relative to which the slide bar is movable. The driving lever 1230 is movable between a first position in which there is substantially no frictional engagement with the slide bar 1210 and a second position in which the driving lever 1230 is frictionally engaged with the slide bar 1210. The first and second positions of the driving lever 1230 are illustrated in and will be discussed with respect to FIGS. 13A and 13B, respectively. With continued reference to FIG. 12, when the driving lever 1230 is not frictionally engaged with the slide bar 1210, the slide bar 1210 may move such that the first jaw 1260 and the second jaw 1265 are separable (e.g., the first jaw 1260 and the second jaw 1265 may be moved apart from each other to release the clamp). In contrast, when the driving lever 1230 is frictionally engaged with the slide bar 1210, the driving lever 1230 prevents the slide bar 1210 from moving. As a result, when the driving lever 1230 is frictionally engaged with the slide bar 1210, the distance between the first jaw 1260 and the second jaw 1265 cannot be increased. In other words, the driving lever 1230 locks the clamp, preventing the first jaw 1260 and the second jaw 1265 from separating. In addition, when in the second position and frictionally engaged with the slide bar 1210, the driving lever 1230 may pull the slide bar 1210 such that the first jaw 1260 and the second jaw 1265 move toward one another to close the clamp.

The trigger handle 1205 may be hingedly coupled to the body 1270 and in contact with the driving lever 1230, and may be configured to engage the driving lever 1230 responsive to actuation by a user for moving the driving lever 1230 between the first position and the second position. In other words, in embodiments, the trigger handle 1205 is moved by the user to engage the driving lever 1230 to move and pull the slide bar 1210 such that the first jaw 1260 moves toward the second jaw 1265.

A spring 1255 biases the driving lever 1230 into the first position where the driving lever 1230 is not frictionally engaged with the slide bar 1210. One end of the spring is in contact with the driving lever 1230, and the other end of the spring 1255 is in contact with the surface of a cavity of the body 1270 in which the spring 1255 and the driving lever 1230 are located. In this way, as the trigger handle 1205 is moved toward the handle, the driving lever pushes against the spring and becomes frictionally engaged with the slide bar 1210 to move the slide bar 1210. Because the driving lever 1230 mechanically interacts with the trigger handle 1205, the spring 1255, in biasing the driving lever 1230 into the first position, also biases the trigger handle 1205 to an open position. In the open position, the trigger handle 1205 is oriented away from the body 1270, the handle 1275, and the slide bar 1210 (e.g., similar to the position shown in FIGS. 5 and 6).

In some embodiments, a trigger handle locking mechanism, such as a sliding tab 1215, for example, is disposed on a proximal end of the handle of the flashlight clamp 1200. The sliding tab 1215 and a proximal end of the trigger handle 1205 have complementary mechanical features such that the sliding tab 1215 may be manually moved into a position that locks that trigger handle 1205 in place. When the trigger handle 1205 is in the locked position, the driving lever 1230 is frictionally engaged with the slide bar 1210. The sliding tab 1215 is movable between a first position to release the trigger handle 1205 and a second position to lock the trigger handle 1205. Accordingly, when the trigger handle 1205 is positioned as shown in FIG. 12 and the sliding tab 1215 is in the second position to lock the trigger handle 1205, the clamp is locked in place such that the slide bar 1210 (and subsequently the first jaw 1260) cannot move (and the clamp cannot open).

In some embodiments, the trigger handle 1205 is connected to the body 1270 at a pivot point 1225, such that the trigger handle 1205 may rotate about the pivot point 1225. When the spring 1255 pushes on and biases the driving lever 1230, and subsequently the trigger handle 1205, the spring 1255 pushes the trigger handle 1205 via the driving lever 1230 away from the slide bar 1210 by causing the trigger handle 1205 to rotate about the pivot point 1225. When the trigger handle 1205 is biased away from the slide bar 1210 and the handle of the clamp, the trigger handle 1205 is at an angle with respect to the slide bar 1210. A vertex of the angle between the trigger handle 1205 and the slide bar 1210 is oriented at a distal end of the trigger handle 1205, and the vertex is therefore closer to the distal end of the flashlight clamp 1200 than the proximal end of the flashlight clamp 1200. This orientation advantageously provides an ergonomic grip for a user to grasp the handle 1275 and the trigger handle 1205 of the clamp to actuate the drive assembly and close the clamp because the proximal end of the trigger handle 1205 is nearer the proximal end of the flashlight clamp 1200, making the trigger handle 1205 easier to grasp and compress toward the handle 1275. The trigger handle 1205 is also disposed on the same side of the slide bar 1210 (e.g., a lower side thereof, in the orientation illustrated in FIG. 12) as the first jaw 1260 and the second jaw 1265.

The body 1270 defines at least one cavity through which the slide bar 1210 extends. The driving lever 1230 is also located within the at least one cavity. In this way, the driving lever 1230 is advantageously not exposed to a user, protecting the user from pinch points and protecting the driving lever 1230 from being inadvertently damaged from direct contact with the user or the environment.

The example flashlight clamp 1200 includes a braking assembly that includes a braking lever 1240, a spring 1250, and a button 1235. The example braking lever 1240 is a plate with a generally rectangular shape. In FIG. 12, a narrow side of the braking lever 1240 is visible. When engaged, the braking assembly prevents the slide bar 1210 from inadvertently moving in a distal direction. If the slide bar 1210 inadvertently moved in the distal direction, the arm 1280, which is rigidly attached to the slide bar 1210, would also move in the distal direction. This in turn would cause the first jaw 1260, which is rigidly connected to the arm 1280, to separate from second jaw 1265, thereby causing the clamp to open. Accordingly, the braking assembly prevents the clamp from inadvertently opening.

In some embodiments, the flashlight clamp 1200 includes a braking lever 1240 which defines an aperture through which the slide bar 1210 extends and is in the at least one cavity of the body 1270. The braking lever 1240 is movable between a first position in which there is substantially no frictional engagement with the slide bar 1210 and a second position in which the braking lever is frictionally engaged with the slide bar 1210. The braking lever 1240 rotates about a pivot point 1245 at substantially the middle of the braking lever 1240 to move between the first position and the second position.

A spring 1250 biases the braking lever 1240 into the second position in which the braking lever 1240 is frictionally engaged with the slide bar 1210 to prevent the slide bar 1210 from moving toward the distal end of the flashlight clamp 1200 (and therefore to prevent the clamp from opening). A first end of the spring 1250 pushes up against the braking lever 1240, and a second end of the spring 1250 pushes up against a surface of the at least one cavity of the body 1270. When the driving lever 1230 is actuated to move the slide bar 1210 toward the proximal end of the flashlight clamp 1200, the frictional engagement of the braking lever 1240 with the slide bar 1210 causes the braking lever 1240 to push against the spring 1250 until the braking lever 1240 is in the first position where there is no frictional engagement with the slide bar 1210 and the slide bar 1210 may move with respect to the braking lever 1240 to close the clamp (e.g., move the first jaw 1260 toward the second jaw 1265). However, even if the braking lever 1240 is in the first position where there is no frictional engagement with the slide bar 1210, the slide bar 1210 does not move with respect to the body 1270 if the trigger handle 1205 is in a locked position such that the driving lever 1230 is frictionally engaged with the slide bar 1210.

A brake release button 1235 is positioned in the body 1270, with a portion of the brake release button 1235 extending out of the body 1270. Actuation of the brake release button causes the braking lever 1240 to move from the second position to the first position. In other words, pressing on the brake release button 1235 causes the braking lever to rotate around the pivot point 1245 and push against the spring 1250, such that the braking lever 1240 moves into the first position where it is not frictionally engaged with the slide bar 1210. In this way, the first jaw 1260 and the second jaw 1265 may be separated when the brake release button 1235 is depressed to move the braking lever 1240 into the first position (provided that the trigger handle 1205 is not in its locked position against the handle as shown in FIG. 12 so that the driving lever 1230 is in a position that is not frictionally engaged with the slide bar 1210).

Figure 13A:
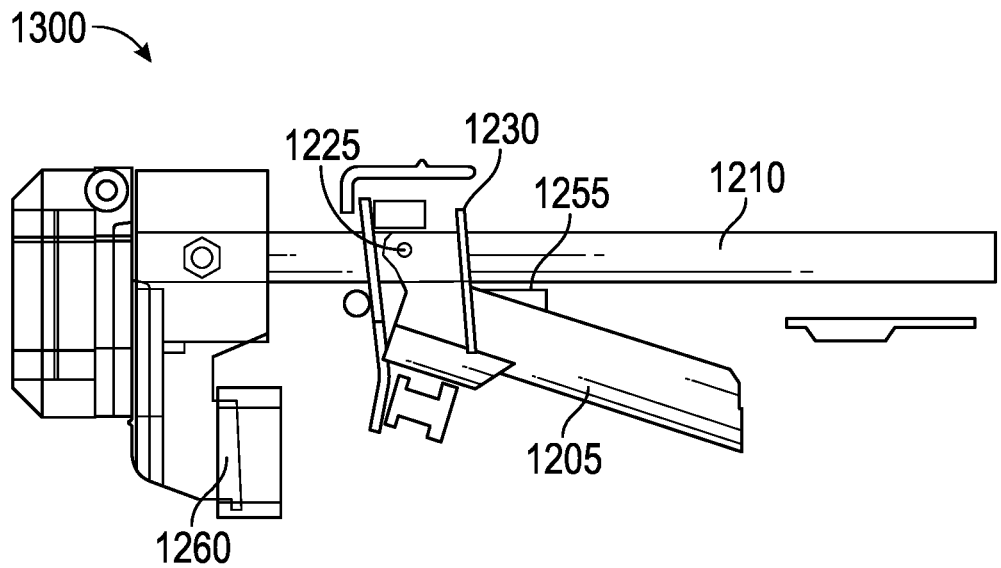
FIG. 13A is a partially-exploded side view of an example flashlight clamp portion with its drive assembly in a first state.
Figure 13B:
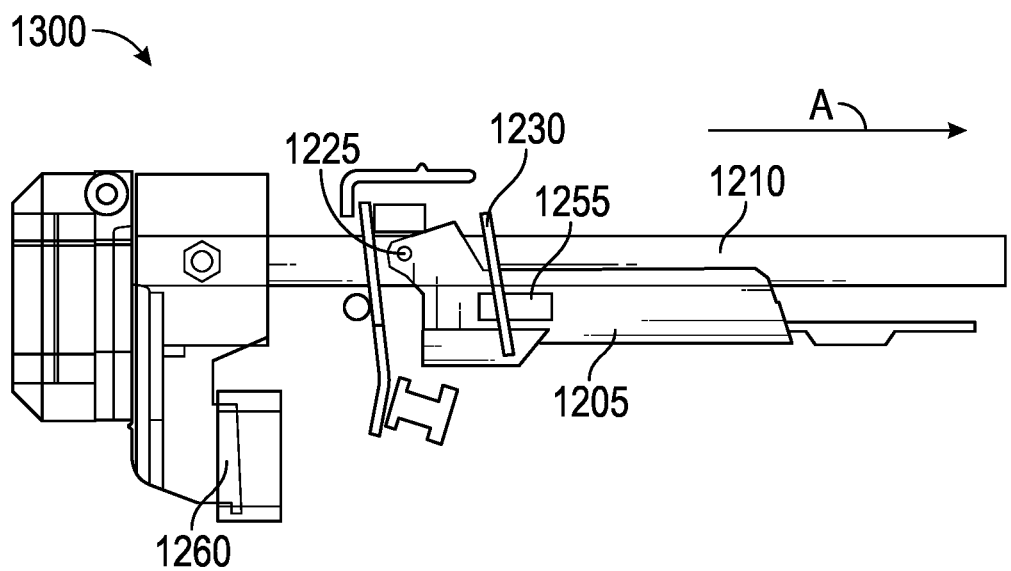
FIG. 13B is a partially-exploded side view of the example flashlight clamp portion of FIG. 13A, with its drive assembly in a second state.

FIGS. 13A and 13B are partially-exploded side views of an example flashlight clamp portion 1300. The example flashlight clamp portion 1300 is a portion of the example flashlight clamp 1200 of FIG. 12. FIG. 13A shows the components in a first state where the driving lever 1230 is not frictionally engaged with the slide bar 1210, while FIG. 13B shows the components in a second state where the trigger handle 1205 has been squeezed toward the slide bar 1210 to actuate the driving lever 1230 to frictionally engage the slide bar 1210 and pull the slide bar 1210 and the first jaw 1260 in a first direction A (e.g., in a direction toward the proximal end of the flashlight clamp portion 1300).

The flashlight clamp portion 1300 includes the slide bar 1210, the trigger handle 1205, the first jaw 1260, the driving lever 1230, the spring 1255, and the pivot point 1225. The components of the flashlight clamp portion 1300 function similar to the components of the flashlight clamp 1200 described with respect to FIG. 12.

The trigger handle 1205 is pivotally coupled to the body (not shown) of the flashlight clamp portion 1300 and the spring 1255 biases the trigger handle 1205 (via the driving lever 1230) into the position shown in FIG. 13A, such that the trigger handle 1205 and the slide bar 1210 are oriented at a first acute angle in relation to one another. In FIG. 13A, the driving lever 1230 is not frictionally engaged with the slide bar 1210. Accordingly, the slide bar 1210 may be moved in the configuration of FIG. 13A to separate the clamp when a user presses a brake release button so that a braking lever is not frictionally engaged with the slide bar 1210.

In FIG. 13B, the trigger handle 1205 has been pulled toward to the slide bar 1210, such that the spring 1255 is compressed. In FIG. 13B, the trigger handle 1205 and the slide bar 1210 are oriented at a second angle in relation to one another, wherein the first acute angle (the angle between the trigger handle 1205 and the slide bar 1210 depicted in FIG. 13A) is greater than the second angle depicted in FIG. 13B. The second angle may be a second acute angle or may be a zero degree angle.

As the trigger handle 1205 moves from the position shown in FIG. 13A to the position shown in FIG. 13B, the trigger handle 1205 actuates the driving lever 1230 to pull the driving lever 1230 in a proximal direction (illustrated as direction A in FIG. 13B), and consequently pull the slide bar 1210 and the first jaw 1260 in the proximal direction A. The driving lever 1230 also rotates slightly (as evident by comparing the driving lever 1230 in FIGS. 13A and 13B) as it is actuated by the trigger handle 1205, so that the aperture of the driving lever 1230 through which the slide bar 1210 passes causes the driving lever 1230 to frictionally engage the slide bar 1210. The driving lever 1230 in FIG. 13B has also moved slightly in the proximal direction A as compared to the driving lever 1230's position in FIG. 13A.

Figure 14A:
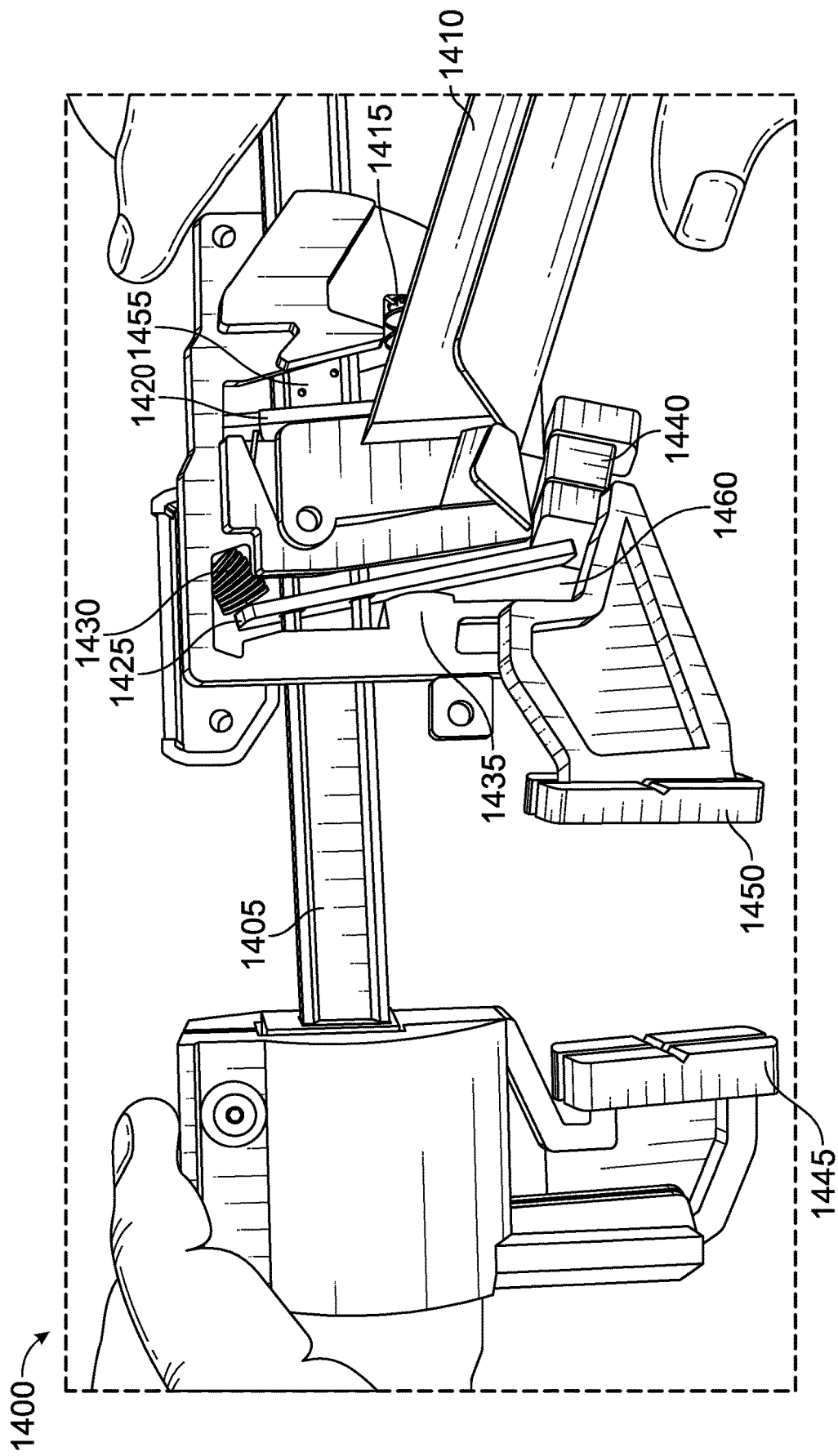
FIG. 14A is a side perspective view of an example flashlight clamp portion and its drive assembly in a first state.

FIGS. 14A-14D are side perspective views of an example flashlight clamp portion 1400 and its drive assembly in various states. The flashlight clamp portion 1400 of FIGS. 14A and 14B show first and second positions, respectively, of a trigger handle 1410 that are similar to the first and second positions demonstrated in FIGS. 13A and 13B. In FIGS. 14A-14D, flashlight clamp 1400 is illustrated without an outer surface of the body for clarity of illustration of the drive and braking assemblies, thereby exposing the cavities of the body in which the drive and braking assemblies are housed). However, in a final product, an outer surface of the body may protect a user from pinch points and protect the components inside the outer shell from damage (e.g., springs, driving and braking levers, etc.). The drive assembly includes a driving lever 1420, a spring 1415, and the trigger handle 1410. The braking assembly includes a braking lever 1425, a spring 1430, a pivot point 1435, and a brake release button 1440. Cavities formed in the body house the driving lever 1420, the spring 1415, a portion of the trigger handle 1410, the spring 1430, the braking lever 1425, a portion of a slide bar 1405, and a portion of the brake release button 1440.

A first cavity 1455 of the body of the flashlight clamp 1400 houses the driving lever 1420, the spring 1415, a portion of the trigger handle 1410, and a portion of the slide bar 1405. The portion of the trigger handle 1410 and the driving lever 1420 can interact within the cavity 1455 to move the slide bar 1405 as described further below by moving the driving lever 1420 between first and second positions. A second cavity 1460 houses the braking lever 1460, the spring 1430, a portion of the slide bar 1405, and a portion of the brake release button 1440.

FIG. 14A shows the trigger handle 1410 in its unlocked, biased away from the slide bar 1405 position. The trigger handle 1410, via the driving lever 1420, is biased into the unlocked position by the spring 1415. As the user compresses the trigger handle 1410 toward the slide bar 1405, the trigger handle 1410 mechanically engages the driving lever 1420 as described herein to move the slide bar 1405, a first jaw 1445, and the driving lever 1420 in a proximal direction A as shown in FIG. 14B. Accordingly, the clamp closes by moving the first jaw 1445 toward a second jaw 1450.

Figure 14C:
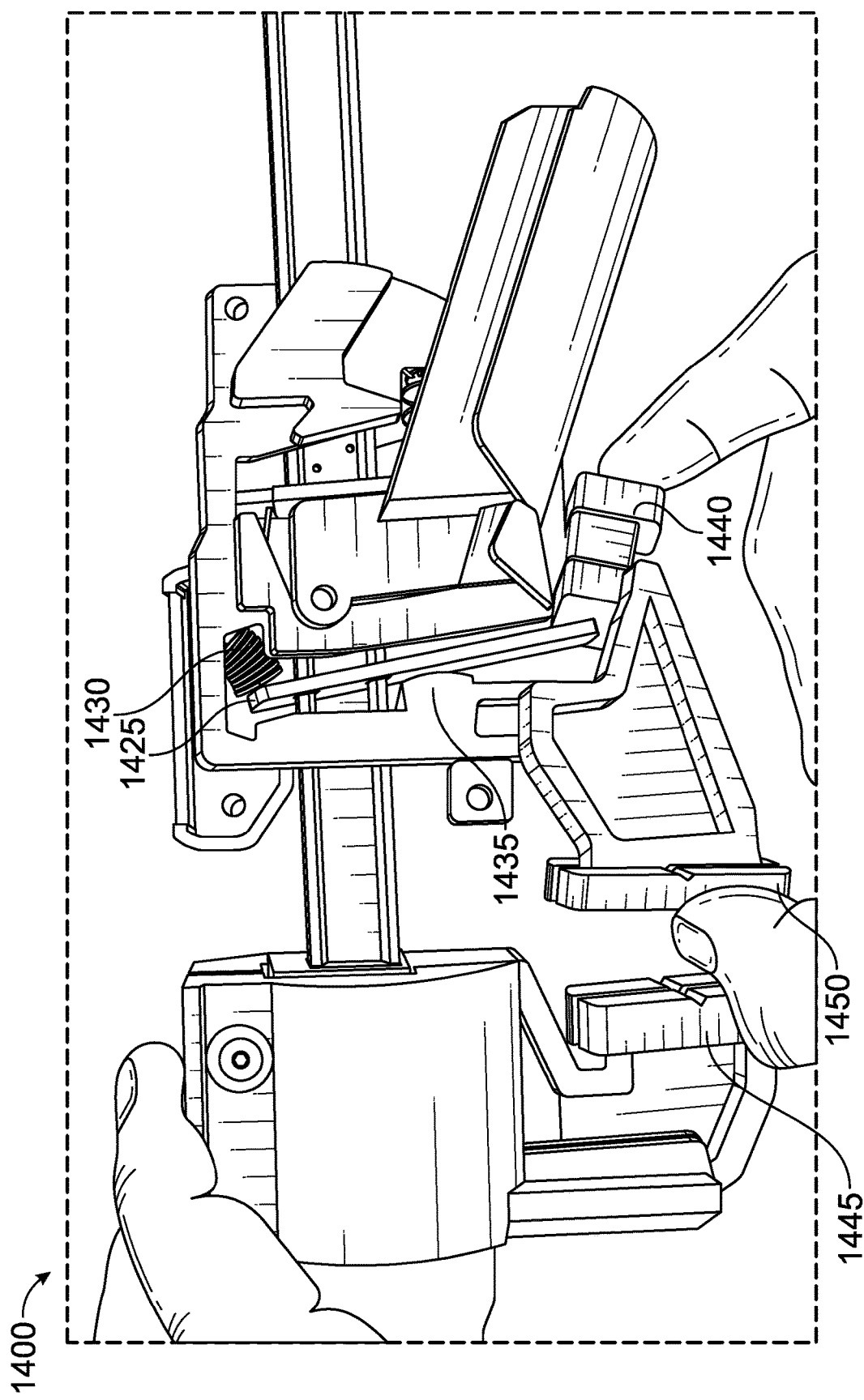
FIG. 14C is a side perspective view of the example flashlight clamp portion of FIG. 14A, with a braking lever shown in a state not frictionally engaged with a slide bar of the clamp.
Figure 14D:
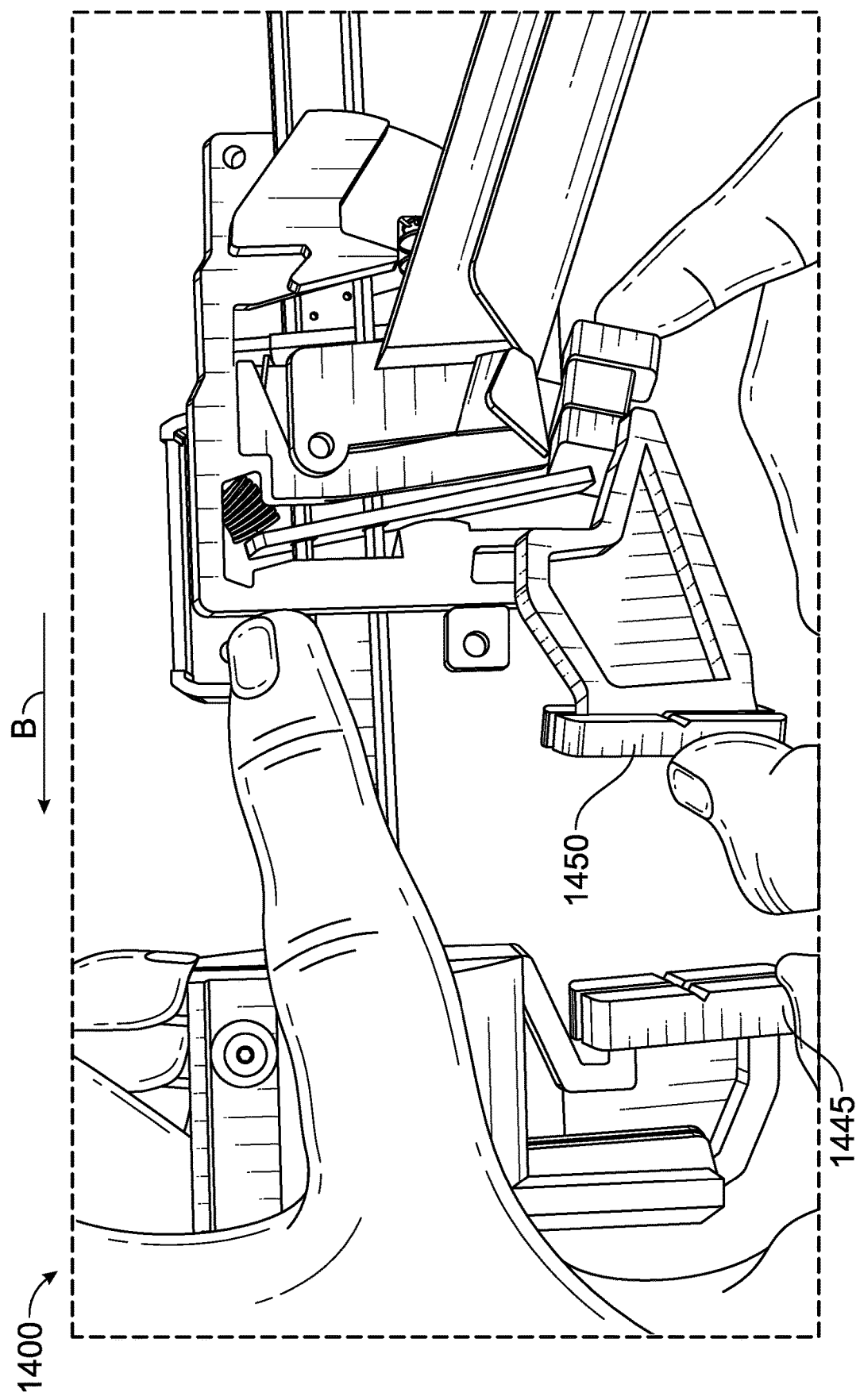
FIG. 14D is a side perspective view of the example flashlight clamp portion of FIG. 14A, with clamp jaws separated.

In FIG. 14C, the user has pressed the brake release button 1440, rotating the braking lever 1425 around the pivot point 1435 against the bias of the spring 1430. As the user holds down the brake release button 1440, the braking lever 1425 is in a position where the aperture in the braking lever 1425 through which the slide bar 1405 passes is not frictionally engaged with the slide bar 1405. Accordingly, as shown in FIG. 14D, the user may separate the first jaw 1445 from the second jaw 1450 by moving the slide bar 1405 and the first jaw 1445 in a distal direction B while the brake release button 1440 is depressed (provided that the trigger handle 1410 is also in the unlocked position). This movement occurs because, in the configuration of FIGS. 14C and 14D, neither of the braking lever 1425 nor the driving lever 1420 are frictionally engaged with the slide bar 1405.

Because of the orientation and configurations of the braking lever 1425 and the driving lever 1420, the first jaw 1445 and the slide bar 1405 may be manually moved in the direction A to close the clamp when the clamp is configured as shown in FIG. 14A. In other words, a user may push the jaws 1445, 1450 together as long as the trigger handle 1410 is not locked by the sliding tab because, as the user pushes the jaws 1445, 1450 together, both the braking lever 1425 and the driving lever 1420 would push against their respective biasing springs to move into a position where they are not frictionally engaged with the slide bar 1405 enough to prevent the slide bar 1405 from moving within the apertures of the braking lever 1425 and the driving lever 1420. The jaws 1445, 1450 may therefore be moved together manually without use of the drive assembly described herein. This is advantageous for the user because each time the trigger handle 1410 is squeezed by the user, the clamp only closes a small amount. Therefore, the user may close the clamp manually most of the way, then use the drive assembly (by squeezing the trigger handle 1410) to close the clamp the rest of the way and/or tighten the clamp around the object that the user desires to affix the clamp to.

Figure 16A:
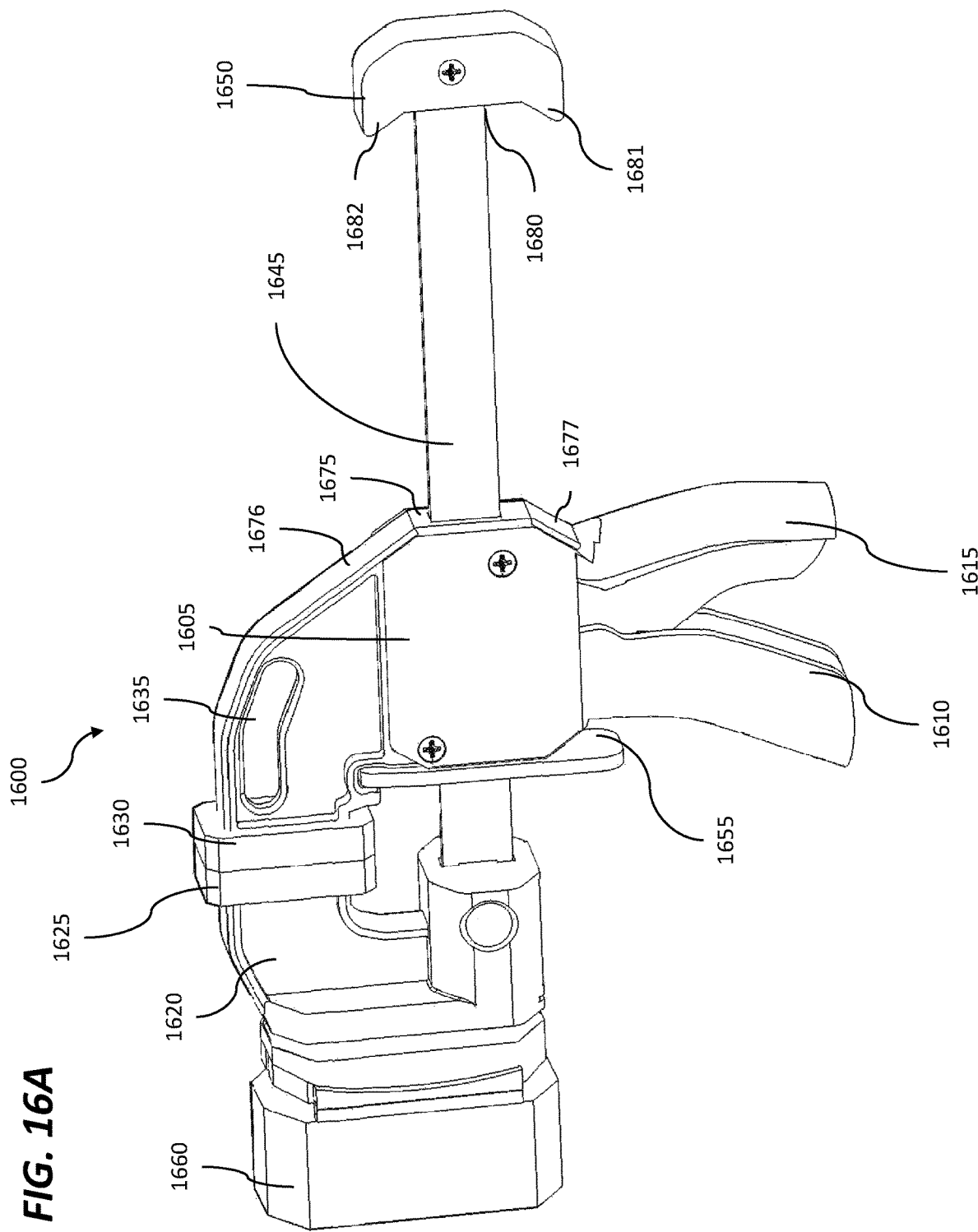
FIG. 16A is a perspective side view of an example flashlight clamp with a handle that is generally oriented perpendicular to a slide bar of the flashlight clamp.

FIG. 16A is a perspective side view of an example flashlight clamp 1600 with a handle that is generally oriented perpendicular to a slide bar of the flashlight clamp. The flashlight clamp 1600 includes a body 1605, a handle 1610, a trigger handle 1615, an arm 1620, a first jaw 1625 connected to the arm 1620, a second jaw 1630 connected to the body 1605, a handle 1635, a slide bar 1645, a slide bar catch 1650, a braking lever 1655, and a light assembly 1660. The flashlight clamp 1600 may include a drive assembly that functions similarly to the drive assemblies discussed above with respect to FIGS. 12, 13A, 13B, and 14A-14D. The drive assembly of the flashlight clamp 1600 may include drive lever inside a housing of the body 1605 that causes the slide bar 1645 to move such that the first jaw 1620 moves toward the second jaw 1625 when the trigger handle 1615 is actuated. The braking lever 1655 prevents the slide bar 1645 from moving such that the first jaw 1620 moves away from the second jaw 1625 unless the braking lever 1655 is actuated by a user of the flashlight clamp 1600 to release the slide bar 1645.

A difference between the drive assembly of the flashlight clamp 1600 and that of the drive assemblies shown in and described with respect to FIGS. 12, 13A, 13B, and 14A-14D is that the braking lever 1655 is not within the housing of the body 1605. Accordingly, the drive assembly of the flashlight clamp 1600 does not have a brake release button penetrating the housing of the body 1605 to actuate the braking lever 1655. Instead, a user may actuate the braking lever 1655 by interacting with the braking lever 1655 itself. Another difference between the drive assembly of the flashlight clamp 1600 and that of the drive assemblies shown in and described with respect to FIGS. 12, 13A, 13B, and 14A-14D is that the handle 1610 and the trigger handle 1615 are oriented generally perpendicular to the slide bar 1645. Despite the difference in orientation, the driving lever (not shown) may still be actuated when the trigger handle 1615 is pulled toward the handle 1610 by the user.

The slide bar catch 1650 is also attached to the slide bar 1645 to limit extension of the slide bar 1645 into the housing of the body 1605. In addition, the shape of the slide bar catch 1650 provides safer operation for a user of the flashlight clamp than an exposed slide bar with no catch. In addition, the shape of the slide bar catch 1650 provides safer operation for a user than other shapes of catches where the user could still easily pinch a finger between the slide bar 1645 and the body 1605. In particular, the body 1605 includes a slide bar receiving surface 1675. The surface 1675 includes an opening through which the slide bar 1645 may pass. The slide bar catch 1650 may come into contact with the surface 1675 at an edge 1680 when the arm 1620 of the flashlight clamp 1600 is pulled by the user to separate the first and second jaws 1625, 1630 of the flashlight clamp 1600. The opening in the surface 1675 through which the slide bar 1645 passes represents a potential pinch point for the user. To reduce the likelihood of such pinching, the slide bar catch 1650 includes a first wing 1681 and a second wing 1682 that extend from the edge 1680 of the slide bar catch 1650 toward the body 1605 of the flashlight clamp 1600. Thus, when the slide bar catch 1650 is close to the surface 1675, the wings may block an opening between the edge 1680 and the surface 1675 such that a user could not put a finger between the edge 1680 and the surface 1675. In addition, surfaces 1676 and 1677 of the body 1605 that are positioned above and below the surface 1675 extend away from the surface 1675 and the slide bar catch 1650 such that the wings 1681, 1682 may rest against the surfaces 1676, 1677, respectively when the edge 1680 comes into contact with the surface 1675. The slide bar catch 1650 is also relatively large compared to a cross-section of the slide bar 1645. The size of the slide bar catch 1650, particularly the shape and dimensions of a side of the slide bar catch 1650 oriented away from the slide bar 1645 and opposite the edge 1680, also provides a safer operation for a user. Flashlight clamps as described herein may be used in tight spaces, crawl spaces, work spaces, or other environments in which a user is working or moving very closely to the flashlight clamp. The relatively large slide bar catch 1650 may prevent injuries (e.g., to a face, eye, chest, etc.) that may occur if there were no slide bar catch or a smaller slide bar catch. For example, the slide bar 1645 may have a cross-sectional dimension such that it could poke a user's eye if there were no slide bar catch attached. The slide bar catch 1650 therefore acts a safety feature to prevent puncture wounds or other types of wounds by blunting or distributing any forces which may be imparted to a body part should a user inadvertently bump a flashlight clamp during use.

The body 1605 also includes a handle 1635. The handle 1635 may provide the user with a convenient structure to hold, grasp, move, and or otherwise manipulate the flashlight clamp 1600 as a whole. The handle 1635 is an opening in the body 1605. The handle 1635 represents just one way in which a handle may be formed into the body 1605. In various embodiments, a handle may be formed into other portions of the flashlight clamp in addition to or instead of into the body 1605. For example, one or more handles may also be formed into the slide bar 1645, the slide bar catch 1650, the arm 1620, etc.

Like the other flashlight clamp embodiments described herein, the light assembly 1660 of the flashlight clamp 1600 may removably attach to one or more surfaces of the flashlight clamp 1600. In the example of FIG. 16A, the light assembly 1660 is attached to a distal surface of the arm 1620. In various embodiments, the light assembly 1660 may attach to other surfaces of the flashlight clamp 1600, such as the any surface of the body 1605, a different surface of the arm 1620 (e.g., at a recess 1665 shown in FIG. 16B), the slide bar catch 1650, the slide bar 1645, etc. The light assembly 1660 may also removably attach to surfaces other than the flashlight clamp as described herein (e.g., to a ferromagnetic surface). In various embodiments, the light assembly 1660 may be or may be similar to the light assembly shown in and described with respect to FIGS. 15A and 15B.

Figure 16B:
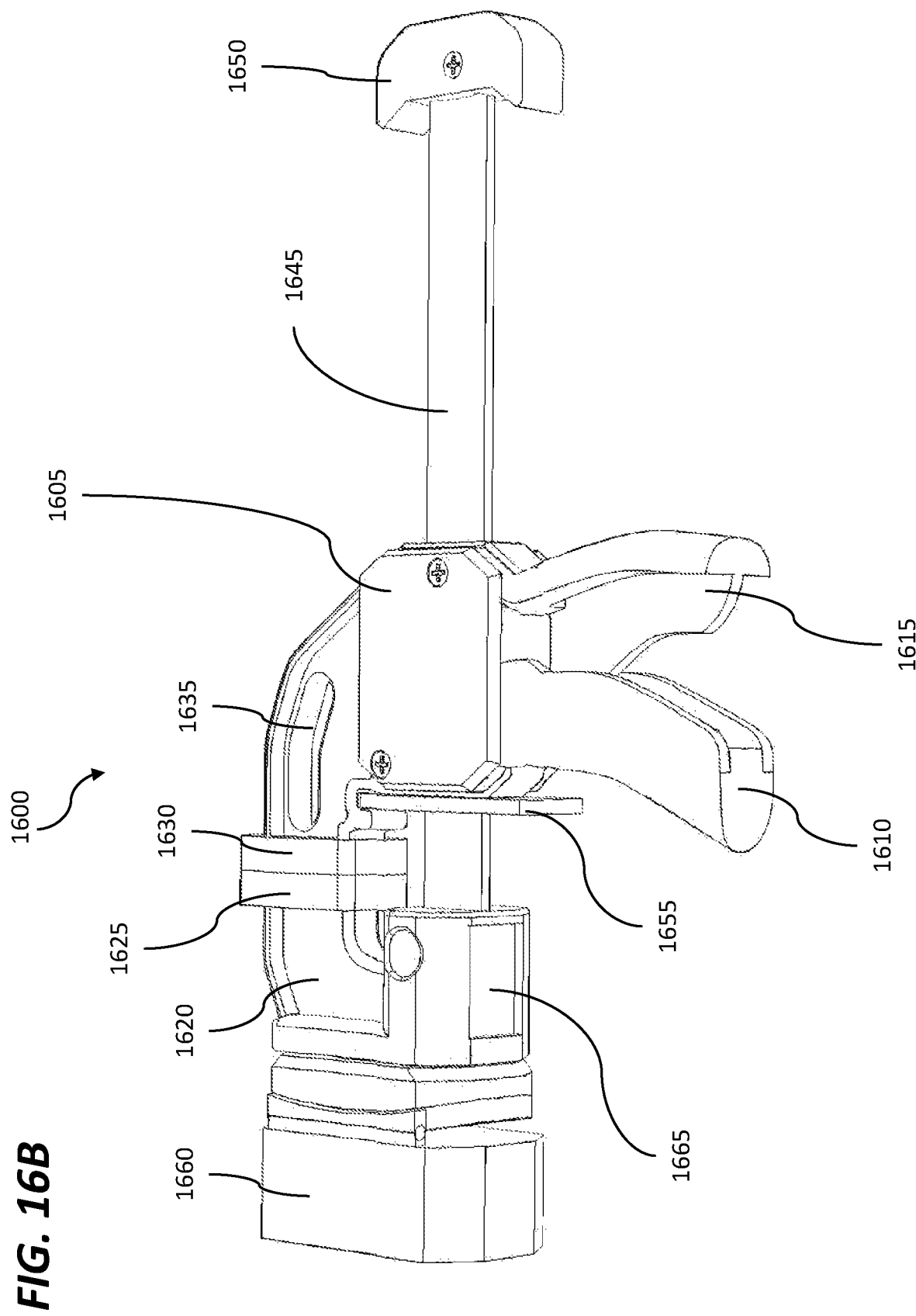
FIG. 16B is perspective bottom view of the example flashlight clamp of FIG. 16A.

FIG. 16B is perspective bottom view of the example flashlight clamp 1600 of FIG. 16A. In the perspective bottom view of FIG. 16B, a recess 1665 in the arm 1620 is shown. The recess 1665 may be configured to receive, for example, a magnet portion of the light assembly 1660 so that the light assembly 1660 may be affixed to the flashlight clamp 1600. The magnet portion of the light assembly 1660 may be or may be similar to the magnet portion 1535 of the light assembly 1500 of FIGS. 15A and 15B. A bottom surface of the recess 1665 may include, for example, a ferromagnetic material such that magnets (e.g., the magnets 1525) may generate a force to adhere the light assembly 1660 to the flashlight clamp 1600. In various embodiments, the magnets may be located in the recess 1665 and the light assembly 1660 may have a ferromagnetic material that is attracted to the magnets in the recess 1665.

Figure 16C:
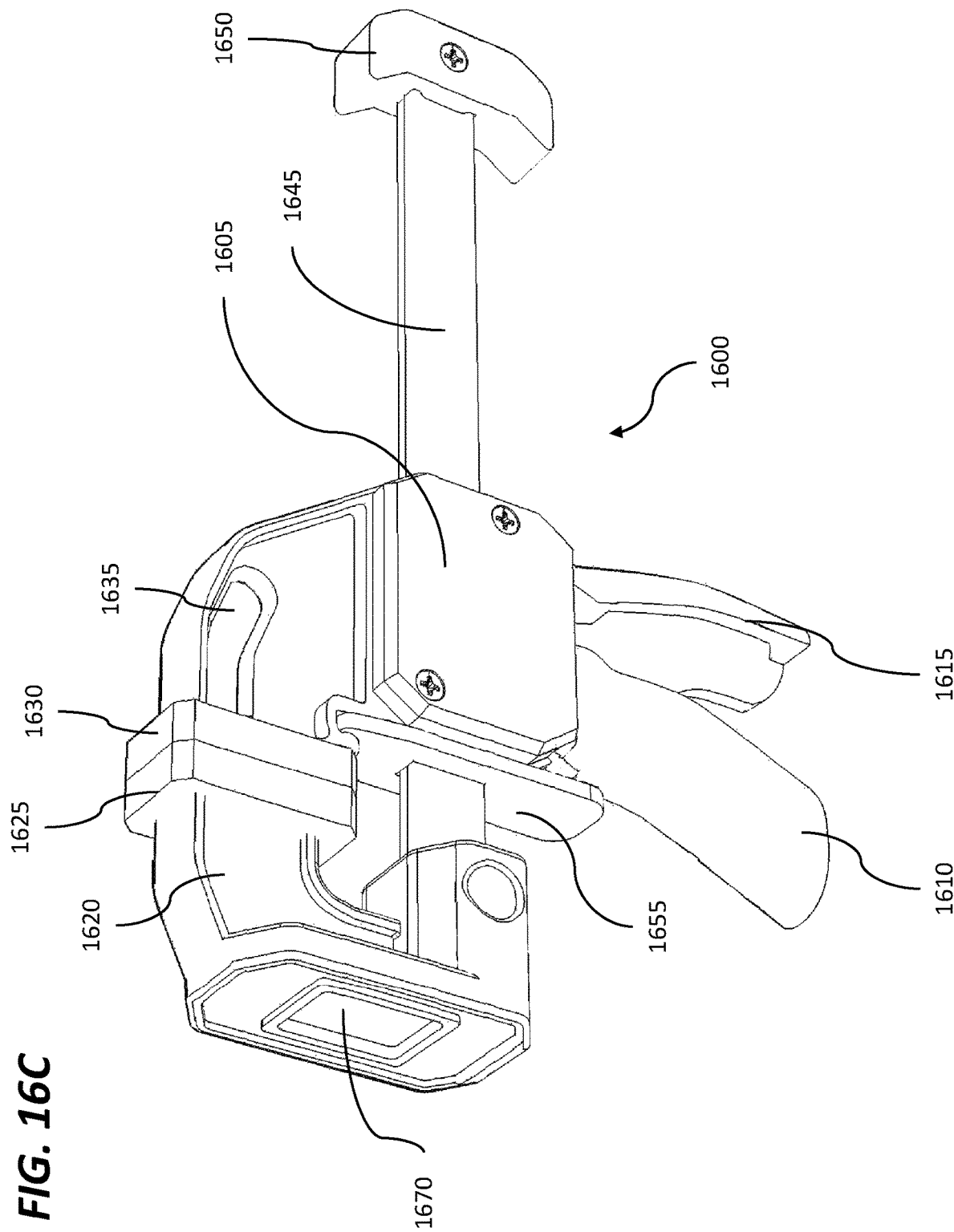
FIG. 16C is a perspective side view of the example flashlight clamp of FIG. 16A with a light assembly removed.

FIG. 16C is a perspective side view of the example flashlight clamp 1600 of FIG. 16A without a light assembly. In other words, the flashlight clamp 1600 is shown in FIG. 16C with the light assembly 1660 removed. Accordingly, a recess 1670 similar to the recess 1665 is shown where the light assembly 1660 may mount to the flashlight clamp, as shown in FIGS. 16A and 16B. As described herein, in various embodiments other similar recesses to the recesses 1665, 1670 may be located in different places on the flashlight clamp 1600 so that the light assembly 1660 may be attached to different location on the flashlight clamp 1600. In addition, the light assembly 1660 may rotate in multiple directions, as described herein with respect to the light assembly 1500 of FIGS. 15A and 15B. In this way, the multiple axes rotation of the light assembly combined with the ability to attach the light assembly 1660 to different locations on the flashlight clamp 1600 enables a user to cause light to be shined in any desired location. Additionally and advantageously, that light may also be shined while the flashlight clamp 1600 is clamped to an object so that the user would not need to hold onto the light assembly 1660 or the flashlight clamp 1600 to cause light to shine in a particular direction.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that apparatuses, systems, and methods consistent with this disclosure may be practiced without these specific details. In other instances, well known methods, procedures, components, and circuits have not been described in detail as not to unnecessarily obscure various aspects of the present disclosure.

We claim:

1. A light clamp apparatus comprising:
a clamp configured to affix the light clamp apparatus to an object; and
a light assembly configured to removably attach to the clamp at least at two different positions on the clamp, the light assembly comprising a magnet, whereby the light assembly is removably attachable to a surface comprising a ferromagnetic metal.

2. The light clamp apparatus of claim 1, wherein the light assembly further comprises:
an attachment portion, a base portion, and a light source portion; and
a hinge connecting the base portion and the light source portion, such that the light source portion is rotatable about the hinge.

3. The light clamp apparatus of claim 2, wherein the base portion rotates with respect to the attachment portion, and the attachment portion removably attaches the light assembly to the clamp.

4. The light clamp apparatus of claim 3, wherein the light source portion is rotatable about the hinge along a first axis, and the base portion is rotatable with respect to the attachment portion along a second axis.

5. The light clamp apparatus of claim 4, wherein the first axis and the second axis are substantially perpendicular to one another.

6. The light clamp apparatus of claim 2, wherein the hinge comprises at least two detents to lock the light source portion in at least two different angular positions with respect to the base portion.

7. The light clamp apparatus of claim 3, wherein the light assembly further comprises a rotation mechanism configured to permit rotation of the base portion with respect to the attachment portion, and further wherein the rotation mechanism comprises at least two detents to lock the base portion in at least two different rotational positions with respect to the attachment portion.

8. The light clamp apparatus of claim 1, wherein the at least two different positions of the clamp where the light assembly is removably attachable comprises a first position on the clamp and a second position on the clamp, and further wherein:
the first position comprises a first surface of the clamp for removably attaching the light assembly;
the second position comprises a second surface of the clamp for removably attaching the light assembly; and
the first surface is perpendicular to the second surface.

9. The light clamp apparatus of claim 1, wherein the clamp further comprises:
a slide bar comprising a first end and a second end;
a first jaw coupled to the first end;
a body slidably receiving the slide bar, the body comprising a second jaw opposing the first jaw; and
a drive assembly for moving the slide bar in a first direction.

10. A light clamp apparatus comprising:
a clamp configured to affix the light clamp apparatus to an object, wherein the clamp comprises:
a slide bar comprising a first end and a second end;
a first jaw coupled to the first end;
a body slidably receiving the slide bar, the body comprising a second jaw opposing the first jaw;
a drive assembly for moving the slide bar in a first direction, the drive assembly comprising:
a driving lever having an aperture through which the slide bar extends, the driving lever movable between a first position in which there is substantially no frictional engagement between the driving lever and the slide bar and a second position in which the driving lever is frictionally engaged with the slide bar;
a trigger handle coupled to the body and configured to engage the driving lever for moving the driving lever between the first position and the second position; and
a locking mechanism coupled to the body and configured to lock the trigger handle in a locked position, wherein the driving lever is frictionally engaged with the slide bar while the trigger handle is in the locked position; and
a light assembly configured to removably attach to the clamp at least at two different positions on the clamp, the light assembly comprising a magnet, whereby the light assembly is removably attachable to a surface comprising a ferromagnetic metal.

11. The light clamp apparatus of claim 10, wherein the body further comprises a cavity formed in the body through which the slide bar extends.

12. The light clamp apparatus of claim 11, wherein the driving lever is located within the cavity.

13. The light clamp apparatus of claim 10, wherein when the trigger handle is engaged with the driving lever to frictionally engage the slide bar, the driving lever pulls the slide bar in a first direction such that the first jaw and the second jaw are moved closer together.

14. The light clamp apparatus of claim 10, further comprising a braking lever having an aperture through which the slide bar extends, the braking lever movable between a first position in which there is substantially no frictional engagement with the slide bar and a second position in which the braking lever is frictionally engaged with the slide bar.

15. The light clamp apparatus of claim 14, wherein the braking lever rotates about a pivot point at substantially the middle of the braking lever to move between the first position and the second position.

16. The light clamp apparatus of claim 14, further comprising:
a brake release button, wherein actuation of the brake release button causes the braking lever to move from the second position to the first position; and
a spring that biases the braking lever in the second position.

17. The light clamp apparatus of claim 10, wherein the trigger handle is pivotally coupled to the body and a spring biases the trigger handle in the first position, such that the trigger handle and the slide bar are oriented at a first acute angle in relation to one another.

18. The light clamp apparatus of claim 17, wherein the spring is compressed while the trigger handle is in the locked position and the trigger handle and the slide bar are oriented at a second acute angle in relation to one another, wherein the first acute angle is greater than the second acute angle.

19. The light clamp apparatus of claim 10, wherein the locking mechanism comprises a sliding tab movable between a first position to release the trigger handle and a second position to lock the trigger handle.

* * * * *